(12) United States Patent
Sugeno et al.

(10) Patent No.: US 10,361,575 B2
(45) Date of Patent: Jul. 23, 2019

(54) POWER STORAGE MODULE, POWER STORAGE APPARATUS, POWER STORAGE SYSTEM, CONTROL METHOD, ELECTRONIC APPARATUS, ELECTRIC VEHICLE, AND ELECTRIC POWER SYSTEM

(71) Applicant: Murata Manufacturing Co., Ltd., Kyoto (JP)

(72) Inventors: Naoyuki Sugeno, Fukushima (JP); Koji Umetsu, Miyagi (JP); Noritoshi Imamura, Miyagi (JP); Hiroaki Ono, Miyagi (JP); Kazumi Sato, Fukushima (JP); Atsushi Ozawa, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 92 days.

(21) Appl. No.: 15/538,504

(22) PCT Filed: Dec. 21, 2015

(86) PCT No.: PCT/JP2015/006355
§ 371 (c)(1),
(2) Date: Jun. 21, 2017

(87) PCT Pub. No.: WO2016/132414
PCT Pub. Date: Aug. 25, 2016

(65) Prior Publication Data
US 2017/0373520 A1    Dec. 28, 2017

(30) Foreign Application Priority Data

Feb. 17, 2015 (JP) .................. 2015-028525

(51) Int. Cl.
*H02J 7/00*    (2006.01)
*H01M 10/44*    (2006.01)
(Continued)

(52) U.S. Cl.
CPC ............ *H02J 7/0063* (2013.01); *B60L 50/50* (2019.02); *B60L 50/66* (2019.02); *B60L 53/22* (2019.02);
(Continued)

(58) Field of Classification Search
USPC ........................................... 320/118
See application file for complete search history.

(56) References Cited

U.S. PATENT DOCUMENTS 9,030,205 B2 *  5/2015  Kamata .............. G01R 31/3658
320/116
2013/0059182 A1 *  3/2013  Komatsu ............. H01M 2/1072
429/93

(Continued)

FOREIGN PATENT DOCUMENTS

CN    2013-051856 A    3/2013
JP    2001-186677 A    7/2001
(Continued)

OTHER PUBLICATIONS

International Search Report (with English translation) dated Mar. 29, 2016 in corresponding international application No. PCT/JP2015/006355 (6 pages).

(Continued)

*Primary Examiner* — Samuel Berhanu
(74) *Attorney, Agent, or Firm* — K&L Gates LLP

(57) ABSTRACT

A power storage apparatus includes a plurality of power storage modules connected in series and a control apparatus that controls each power storage module. The power storage module includes a battery section, a controller, a communication unit, a first insulator that insulates the controller from the communication unit, and a second insulator having a withstand voltage higher than a withstand voltage of the first insulator. The second insulator is provided between the (Continued)

communication unit of each power storage module and the control apparatus.

13 Claims, 22 Drawing Sheets

(51) Int. Cl.
  *H01M 10/42* (2006.01)
  *B60L 50/50* (2019.01)
  *B60L 53/22* (2019.01)
  *B60L 50/60* (2019.01)

(52) U.S. Cl.
  CPC ......... *H01M 10/425* (2013.01); *H01M 10/44* (2013.01); *H01M 10/441* (2013.01); *H02J 7/0014* (2013.01); *H02J 7/0018* (2013.01); *H01M 2010/4271* (2013.01); *H01M 2010/4278* (2013.01); *H01M 2220/20* (2013.01); *H02J 2007/0067* (2013.01); *Y02T 10/7055* (2013.01)

(56) References Cited

U.S. PATENT DOCUMENTS

2013/0082659 A1* 4/2013 Kano .................... H01M 2/105
                                                                 320/128
2013/0099795 A1* 4/2013 Kamata .............. G01R 31/3658
                                                                 324/434
2015/0222131 A1* 8/2015 Kano .................... H02J 7/0013
                                                                 320/112

FOREIGN PATENT DOCUMENTS

| JP | 2008-288109 A | 11/2008 |
| JP | 2011-259545 A | 12/2011 |
| JP | 2012-182911 A | 9/2012 |
| JP | 2014-222216 A | 11/2014 |

OTHER PUBLICATIONS

Written Opinion dated Mar. 18, 2016 in corresponding international application No. PCT/JP2015/006355 (6 pages).
Japanese Office Action dated Jul. 10, 2018 in corresponding Japanese Application No. 2017-500483.
Japanese Office Action dated Dec. 4, 2018 in corresponding Japanese Application No. 2017-500483.

* cited by examiner

POWER STORAGE MODULE, POWER STORAGE APPARATUS, POWER STORAGE SYSTEM, CONTROL METHOD, ELECTRONIC APPARATUS, ELECTRIC VEHICLE, AND ELECTRIC POWER SYSTEM

CROSS-REFERENCE TO RELATED APPLICATIONS

The present application claims the benefit of International Application No. PCT/JP2015/006355, filed Dec. 21, 2015, which claims priority to Japanese Application No. 2015-028525, filed Feb. 17, 2015, the disclosures of which are incorporated herein by reference.

BACKGROUND

The present technology relates to a power storage module, a power storage apparatus, a power storage system, a control method, an electronic apparatus, an electric vehicle, and an electric power system.

In recent years, the application of a secondary battery such as a lithium ion secondary battery is rapidly expanded to a power storage apparatus for storing electric power, which is combined with a new energy system such as a solar battery and wind power generation, a storage battery for an automobile, and the like. For example, Patent Literature 1 below employs a configuration in which a plurality of power storage modules are connected in series for generating significant power.

CITATION LIST

Patent Literature

Patent Literature 1: Japanese Patent Application Laid-open No. 2011-259545

SUMMARY

Technical Problem

More significant power may be required as in a railway system, for example, in a manner that depends on the application of the secondary battery. Thus, it is desirable to construct a power storage system depending on those requirements.

Therefore, it is one of objects of the present technology to provide a power storage module, a power storage apparatus, a power storage system, a control method, an electronic apparatus, an electric vehicle, and an electric power system, which are compatible with a power storage system capable of outputting high voltage.

Solution to Problem

In order to solve the above-mentioned problem, the present technology is, for example,
a power storage module including:
a battery section;
a controller;
a communication unit;
a first insulator that insulates the controller from the communication unit; and
a second insulator having a withstand voltage higher than a withstand voltage of the first insulator.

Further, the present technology is, for example,
a power storage apparatus including:
a plurality of power storage modules connected in series; and
a control apparatus that controls each power storage module, the power storage module including
a controller,
a communication unit,
a first insulator that insulates the controller from the communication unit, and
a second insulator having a withstand voltage higher than a withstand voltage of the first insulator, the second insulator being provided between the communication unit of each power storage module and the control apparatus.

The present technology is, for example,
a power storage system including:
a plurality of power storage apparatuses each being the above-mentioned power storage apparatus, the plurality of power storage apparatuses being connected in series; and
an integrated control apparatus that communicates with each control apparatus.

The present technology may be an electronic apparatus that receives supply of electric power from the above-mentioned power storage system.

The present technology may be an electric vehicle including: a conversion apparatus that receives supply of electric power from the above-mentioned power storage system and converts the electric power into driving force of a vehicle; and a control apparatus that performs information processing relating to vehicle control on the basis of information on the power storage apparatus.

The present technology may be an electric power system including an electric power information transmitter/receiver that transmits/receives a signal to/from another apparatus via a network, the electric power system performing charge/discharge control of the above-mentioned power storage system on the basis of information received by the transmitter/receiver.

The present technology may be an electric power system that receives supply of electric power from the above-mentioned power storage system or supplies electric power to the power storage system from a power generation apparatus or an electric power network.

The present technology is, for example,
a control method in the above-mentioned power storage system, including: by the integrated control apparatus,
performing control to selectively supply output of a predetermined power storage apparatus of the plurality of power storage apparatuses to a load; and
performing control to increase, when the output of the predetermined power storage apparatus is selectively supplied to the load, discharge current of the predetermined power storage apparatus while keeping the discharge current below an upper limit value.

Advantageous Effects of Invention

In accordance with at least one embodiment of the present technology, it becomes possible to provide a power storage module, a power storage apparatus, a power storage system, a control method, an electronic apparatus, an electric vehicle, and an electric power system, which are compatible with a power storage system capable of outputting high voltage. Note that the effects described here are not necessarily limited and may be any of effects described in the present technology. Further, it should not be construed that exemplified effects limit the contents of the present technology.

DETAILED DESCRIPTION

Figure 1:
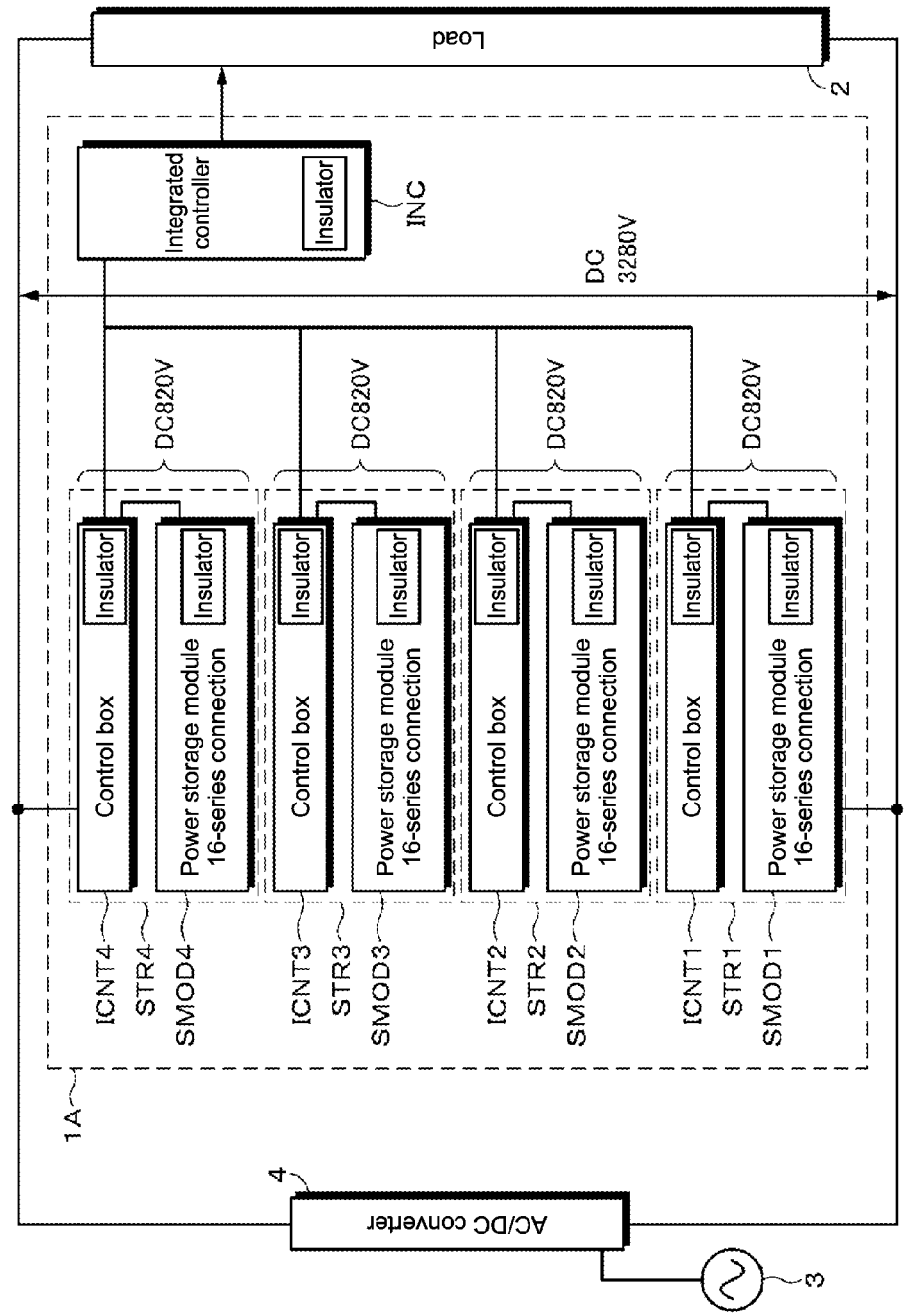
FIG. 1 is a block diagram for describing a configuration example of a power storage system and the like in a first embodiment.

Hereinafter, embodiments of the present technology and the like will be described with reference to the drawings. Note that descriptions will be made in the following order.

<1. First Embodiment>
<2. Second Embodiment>
<3. Application Examples>
<4. Modified Examples>

The embodiments and the like described hereinafter are specific, favorable examples of the present technology. The contents of the present technology are not limited to those embodiments and the like.

(Regarding Example of Secondary Battery)

First, a secondary battery applicable to the embodiments of the present technology and the like will be described. An example of the secondary battery is a lithium ion secondary battery including a positive electrode active material and a carbon material such as graphite as a negative electrode active material. The example of the secondary battery contains a positive electrode active material having an olivine structure as a positive electrode material.

The positive electrode active material having the olivine structure is more favorably a lithium iron phosphate compound ($LiFePO_4$) or favorably a lithium-iron-complex phosphate compound containing different atoms ($LiFe_xM_{1-x}O_4$: M is one or more kinds of metal; and x is $0<x<1$). Further, in the case where M is two or more kinds, selection is performed such that a sum of the respective inferior figures becomes 1-x.

Examples of M include transition elements, group IIA elements, group IIIA elements, group IIIB elements, and group IVB elements. In particular, one including at least one kind of cobalt (Co), nickel, manganese (Mn), iron, aluminum, vanadium (V), and titanium (Ti) is favorable.

Regarding the positive electrode active material, a coating layer may be applied to a surface of a lithium iron phosphate compound or a lithium iron composite phosphate compound. The coating layer contains a metallic oxide (e.g., one selected from Ni, Mn, Li, and the like) having a composition different from that of such an oxide, a phosphoric acid compound (e.g., lithium phosphate), and the like.

As a positive electrode material capable of occluding and discharging lithium (Li), a lithium-manganese composite oxide such as a lithium cobalt oxide ($LiCoO_2$) having a layered rock salt structure, a lithium nickel oxide ($LiNiO_2$), a lithium manganese oxide ($LiMnO_2$), and a lithium manganese oxide ($LiMn_2O_4$) having a spinel structure may be used.

Graphite used as the negative electrode active material is not particularly limited and a graphite material used in the art can be widely used. A lithium titanate, a silicon (Si)-based material, a tin (Sn)-based material, or the like may be used as the material of a negative electrode.

A manufacturing method for the electrode of the battery is not particularly limited and a method used in the art can be widely used.

Electrolyte used in the present technology is not particularly limited and electrolyte used in the art, which may be in liquid or gel form, can be widely used.

(Regarding Power Storage System)

FIG. 1 is a diagram showing configurations of a power storage system 1A and the like in a first embodiment of the present technology. The power storage system 1A includes, schematic, four strings STR1 to 4 connected in series and an integrated controller INC as an integrated control apparatus. The string STR includes a power storage module group SMOD configured by 16 power storage modules MOD being connected in series and a control box ICNT as a control apparatus that controls each power storage module MOD. The string STR is configured to enable communication to be performed between the control box ICNT and the integrated controller INC. Note that the integrated controller INC may be called EMU (Energy Management Unit) and the control box ICNT may be called BMU (Battery Management Unit).

In the embodiment, the output of one power storage module MOD is approximately 51.2 V (volts). The output of the power storage module group SMOD in which such 16 power storage modules MOD are connected in series is approximately 820 V (51.2 V×16). That is, output of each string STR is approximately 820 V and the power storage system 1A in which the four strings STR are connected in series is capable of outputting high voltage of approximately 3280 V (820 V×4). The output of the power storage system 1A is supplied to a load 2 of a railway or the like that requires high voltage.

A system 3 is connected to a DC electric power supply system shown in FIG. 1 via an AC (Alternating Current)/DC (Direct Current) converter 4. The system 3 is a high voltage power distribution system that supplies high voltage of, for example, approximately 2500 to 3500 V. In the case where AC electric power is supplied from the system 3, the AC electric power is converted into DC electric power by the AC/DC converter 4. Electric power supplied from the system 3 may be supplied to the load 2 and a predetermined power storage module MOD in the power storage system 1A may be charged with the electric power supplied from the system 3. The output of the power storage system 1A may be supplied to an electric power company and the like via the system 3 for selling electricity.

Note that, although details will be described, the integrated controller INC, the control box ICNT, and each power storage module MOD include insulators that makes output equal to or higher than the output of the power storage system 1A possible as direct-current insulation voltage. As an example, in an insulator of the embodiment of the present disclosure, 4 kV (kilovolts) is made possible as the direct-current insulation voltage.

(Regarding String)

Figure 2:
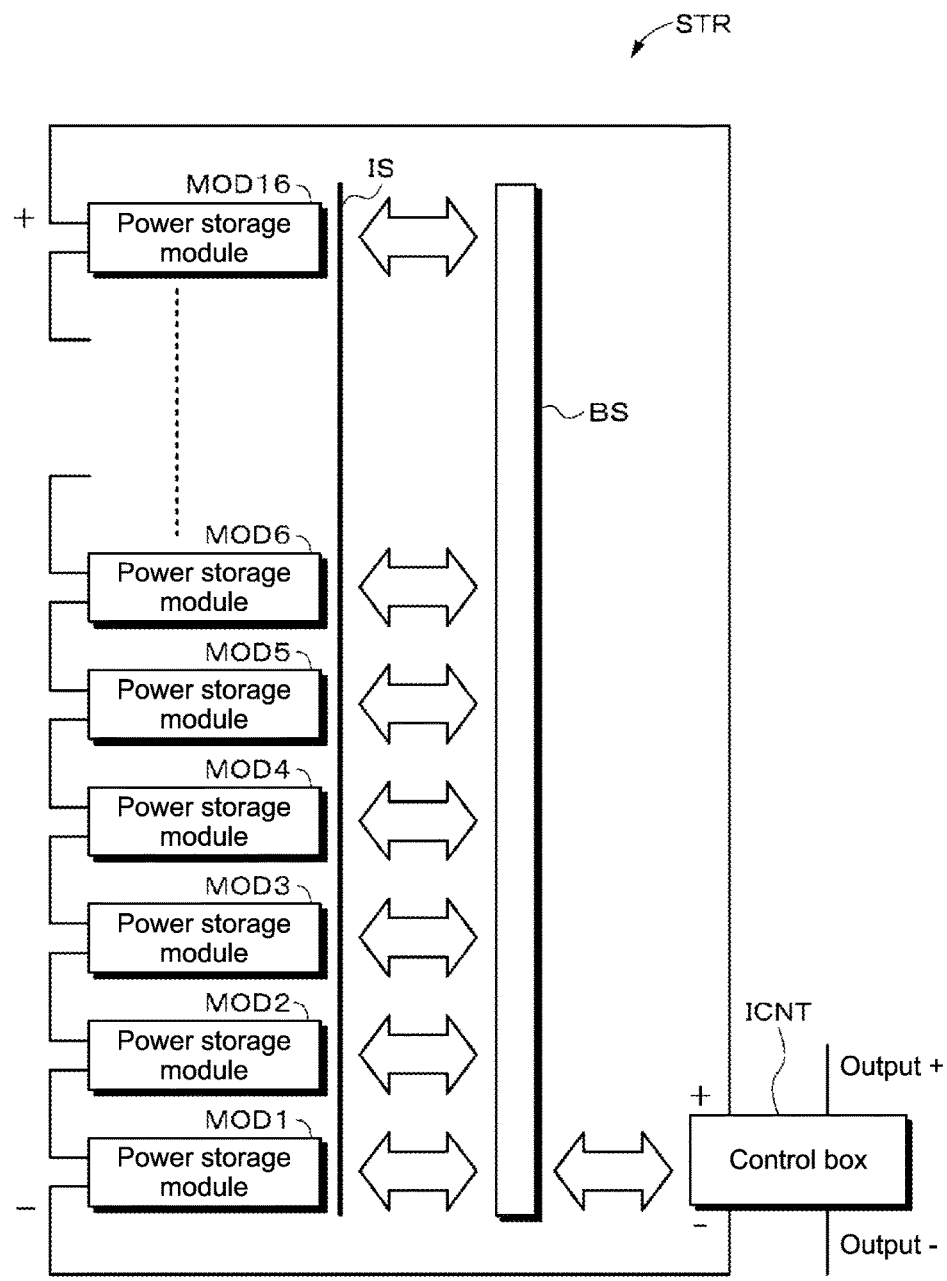
FIG. 2 is a diagram for describing a configuration example of a string in the embodiment.

The string STR is a unit combining the plurality of power storage modules MOD and the control box ICNT. As shown in FIG. 2, 16 power storage modules MOD1 to MOD16 are connected in series as an example. The power storage modules MOD1 to MOD16 are connected to an interface bus BS via an insulator IS.

Each power storage module MOD includes a module controller (not shown). Each module controller is connected to the control box ICNT. The control box ICNT performs charge management, discharge management, and management for degradation reduction and the like. The control box ICNT is constituted of a microcomputer.

As a bus in the power storage module MOD and the bus BS that connects the power storage module MOD and the control box ICNT, a serial interface is used. As the serial interface, specifically, an SM bus (System Management Bus), a CAN (Controller Area Network), an SPI (Serial Peripheral Interface), and the like are used. For example, an I2C bus can be used. The I2C bus performs serial communication in a synchronous method with two signal lines of an SCL (serial clock line) and a bidirectional SDA (serial data line).

Communication is performed between the module controller of each power storage module MOD and the control box ICNT. Due to this communication, information on an internal state of each power storage module MOD, that is, battery information is received by the control box ICNT. Charge processing and discharge processing of each power storage module MOD are managed. The control box ICNT supplies output (16×51.2 V) of series connection of the 16 power storage modules to the load 2. Note that the number of power storage modules MOD is not limited to 16 and can be appropriately changed.

(Example of Power Storage Module)

Figure 3:
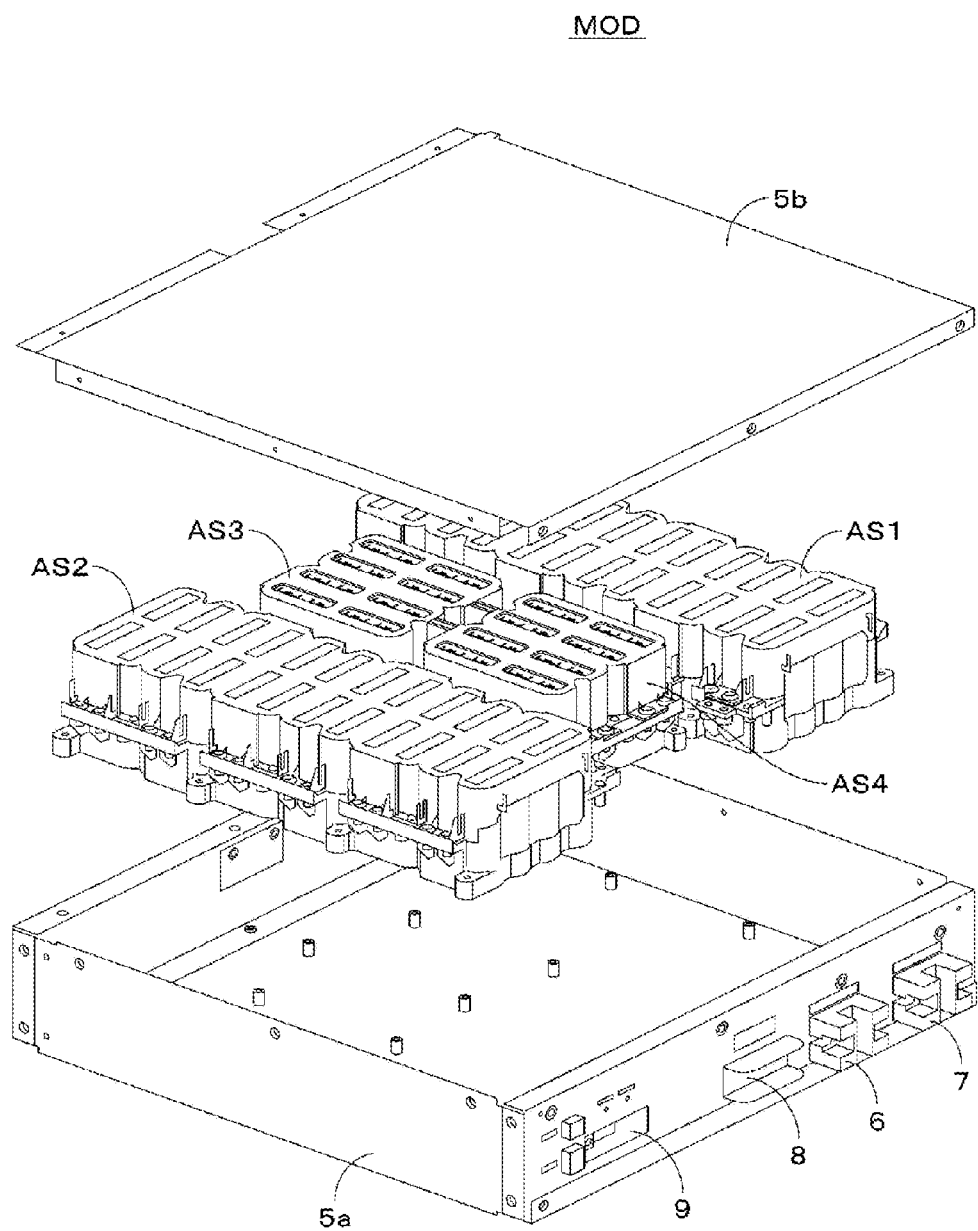
FIG. 3 is an exploded perspective view of a power storage module in the embodiment.

FIG. 3 is an exploded perspective view showing a mechanical configuration of the power storage module MOD. An exterior enclosure of the power storage module MOD is formed of an exterior lower enclosure 5a and an exterior upper enclosure 5b, which are made of metal. Sheet metal processing has been performed on the exterior lower enclosure 5a and the exterior upper enclosure 5b. As the material of the exterior lower enclosure 5a and the exterior upper enclosure 5b, it is favorable to use a material having a high thermal conductivity and emissivity. It is possible to achieve an excellent casing heat dissipation property and reduce temperature rise in the enclosure. For example, examples of the material of the exterior lower enclosure 5a and the exterior upper enclosure 5b include aluminum, an aluminum alloy, copper, and a copper alloy. On the back surface of the enclosure, an external positive electrode terminal 6 and an external negative electrode terminal 7 for charge and discharge of the power storage module MOD are provided.

Further, on the back surface of the power storage module MOD, a current breaker 8 is provided. By providing the current breaker 8, it is possible to improve the safety. Further, a connector section 9 for communication with a control circuit placed in the enclosure 5 is provided. The control circuit is provided to monitor the temperature in the battery unit and control charging, discharging, and the like. Further, on the front surface of the enclosure, a display element such as an LED, which shows an operation state, is provided.

The exterior lower enclosure 5a of the enclosure 5 has a box-shaped configuration, and the exterior upper enclosure 5b is provided so as to cover an opening of the exterior lower enclosure 5a. In a housing space of the exterior lower enclosure 5a, submodules AS1 to AS4 are housed. In order to fix the submodules AS1 to AS4 with screws or the like, a plurality of bosses are formed on the bottom surface of the exterior lower enclosure 5a. The submodules AS1 to AS4 are assembled outside the enclosure in advance.

Each submodule is obtained by integrating a plurality of battery blocks with insulating enclosures as sub-enclosures. As an enclosure of the submodule, a molded part such as plastic can be used. The submodules AS1 to AS4 each house a plurality of battery blocks in the enclosure so that the positive electrode terminal and the negative electrode terminal of the internal battery block are not exposed.

One battery block is obtained by connecting eight cylindrical lithium ion secondary batteries in parallel, for example. The submodules AS1 and AS2 are each obtained by integrating six battery blocks with an upper enclosure and a lower enclosure. The submodules AS3 and AS4 are each obtained by integrating two battery blocks with an upper enclosure and a lower enclosure. Therefore, in total, (6+6+2+2=16) battery blocks are used. These battery blocks are connected in series, for example.

In each of the submodules AS1 to AS4, a metal plate for connection such as a bus bar is used to connect the battery blocks in series. The bus bar is metal in a long bar shape. In the bus bar, a plurality of holes are formed for connection with a connection metal plate or the like derived from the battery block.

Figure 4:
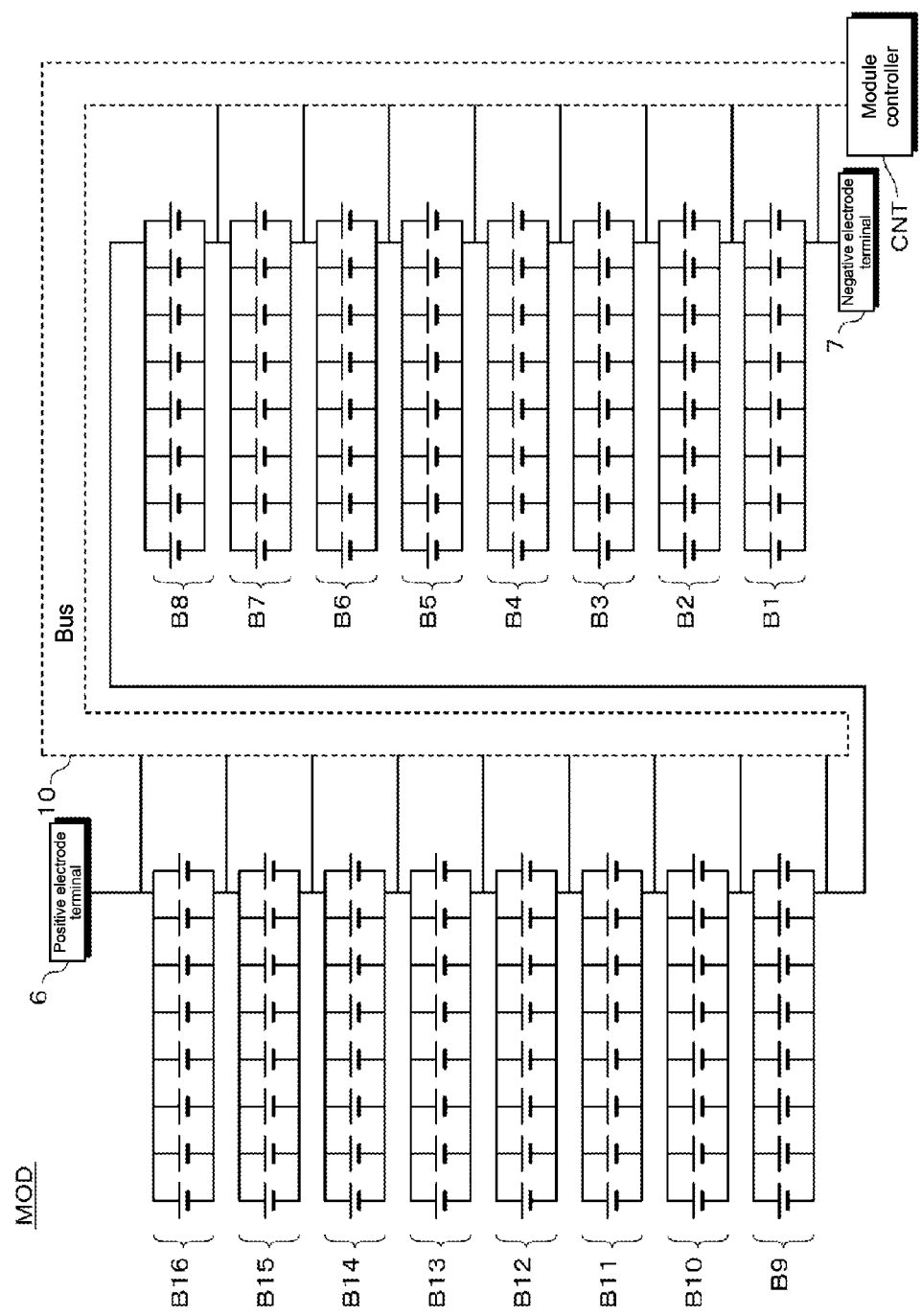
FIG. 4 is a diagram for describing a connection form of power storage modules in the embodiment.

As shown in FIG. 4, battery blocks B1 to B16 are connected in series. In each battery block, eight batteries are connected in parallel. Connecting eight batteries in parallel is referred to as 8P (Parallel). Connecting 16 battery blocks in series is referred to as 16S (Series). Therefore, a battery section (sometimes referred to as battery block group) BB of each power storage module MOD shown in FIG. 4 has a configuration of 8P16S. Each of the battery blocks B1 to B16 is connected to a module controller CNT as the control apparatus of each power storage module MOD. Charge and discharge of the battery blocks B1 to B16 are controlled by the module controller CNT. The charge and discharge are performed via the external positive electrode terminal 6 and the external negative electrode terminal 7. For example, the submodule AS1 includes the battery blocks B1 to B6 and the submodule AS2 includes the battery blocks B11 to B16. Further, the submodule AS3 includes the battery blocks B7 and B10 and the submodule AS4 includes the battery blocks B8 and B9. The output of the power storage module MOD to which the above-mentioned lithium ion secondary battery is applied is at 51.2 V (16×3.2 V). Note that a configuration of the battery section can be appropriately changed.

Information on voltage between the positive electrode and the negative electrode of each battery block or the like is supplied to the module controller CNT as the controller via a bus 10. The module controller CNT monitors voltage, current, and temperature of each battery block and outputs the monitoring result as the battery information.

Figure 5:
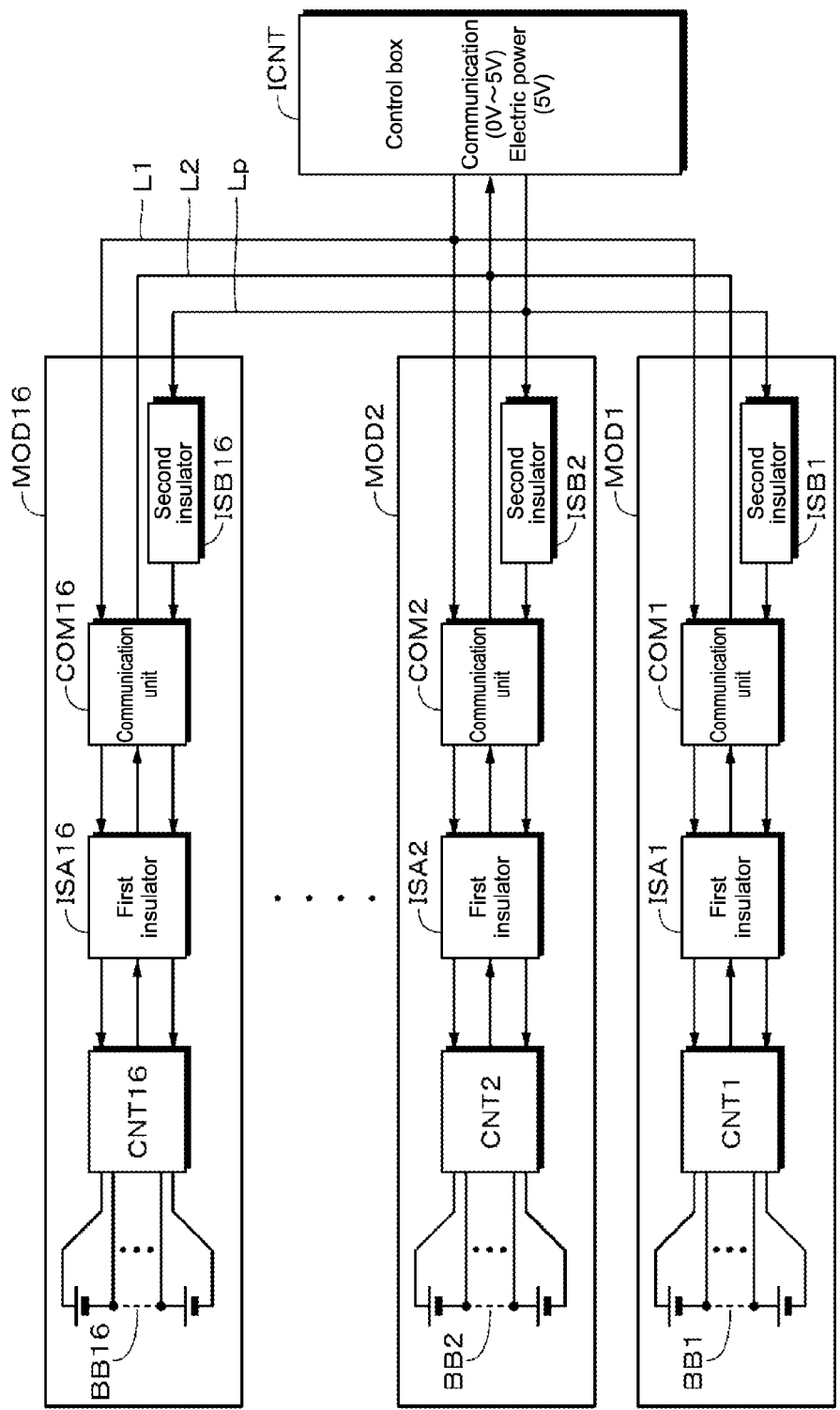
FIG. 5 is a diagram for describing a main configuration of the string in the embodiment.

The power storage module MOD will be described in detail with reference to FIGS. 5 and 6. Each power storage module MOD includes a communication unit COM, a first insulator ISA, the module controller CNT, a battery block group BB, and a second insulator ISB. Note that, in the figure, the reference sign corresponding to each power storage module MOD is added to each configuration. Further, in order to avoid complicated illustration, the reference signs of some configurations are omitted.

Connection between the power storage module MOD and the control box ICNT is established by lines L1 and L2 for communication and a line Lp for a power source. Bidirectional communication is performed between the control box ICNT and the power storage modules MOD1 to MOD16 through the lines L1 and L2 for communication. For example, CAN is used as a communication method. The CAN is recently used as a car-mounted LAN.

The module controller CNT includes a multiplexer that sequentially outputs voltage of both ends of the battery blocks B1 to B16 and voltage of each battery block, for example, an A/D converter (ADC) that converts single analog voltage data selected by the multiplexer into digital voltage data, and a control unit (REGCNT) for performing switching control for performing balance processing to be described later and communication with the communication unit. A control signal is input into the control unit via the communication from the control box ICNT. Note that temperature, current, and the like of the battery blocks B1 to B16 may be acquired by the module controller CNT.

The module controller CNT (ADC, control unit, and the like) is a low-voltage power source section capable of operating with electric power having a low voltage (e.g., approximately 3.5 V to 5 V). In the present technology, a configuration in which electric power to the low-voltage power source section is supplied from the control box ICNT is employed. There is a fear that a balance between the power storage modules MOD may be broken if electric power is supplied from the battery blocks B1 to Bn. In the present technology, electric power to the low-voltage power source section of the module controller CNT is supplied from the control box ICNT, and hence such a problem does not occur.

The communication unit COM of each power storage module MOD includes a communication unit for performing communication, an MCU (Micro Controller Unit) that controls the respective sections of the communication unit COM, and a power source section. Power source voltage of 3.5 V, for example, is input into the power source section from the control box ICNT through the line Lp for a power source.

The first insulator ISA has a function of insulating the communication unit COM from the module controller CNT. Specifically, a reference potential of each power source of the communication unit COM and a reference potential of each power source of the module controller CNT are separated from and independent of each other. Further, the first insulator ISA has a function of supplying the power source voltage input via the power source section of the communication unit COM to the module controller CNT and each function as a transmission medium of bidirectional communication, in an insulated state.

As a method of bidirectional communication performed via the first insulator ISA, the CAN standard can be used. As a method of transmitting electric power via the first insulator ISA, it is possible to use an electromagnetic induction method, a magnetic field resonance method, a radio wave reception method, and the like.

In the present technology, a non-contact IC card technology is used. In the non-contact IC card technology, an antenna coil of a reader/writer (R/W) and an antenna coil of a card (Card) are magnetic flux-coupled with each other and communication and electric power transmission are performed between the reader/writer and the card. The communication uses a method of ASK (Amplitude Shift Keying)-modulating a carrier wave having a frequency of 13.56 kHz and is performed at a speed of 212 or 424 kbps. The specification of the first insulator ISA is similar to that of the above-mentioned non-contact IC card method. Further, the first insulator ISA is provided so that communication and electric power transmission are performed between antennas (coils) formed in different layers of a multilayer printed circuit board.

Figure 7:
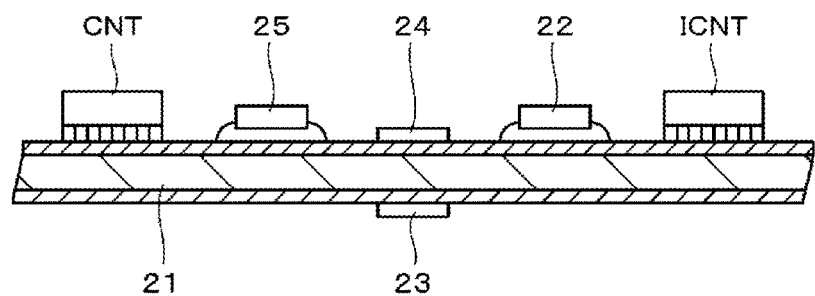
FIG. 7 is a diagram showing a mounting state of parts with respect to a multilayer wiring substrate of the power storage module in the embodiment.

As shown in FIG. 7, an MPU (Micro Processing Unit) constituting the control box ICNT and an LSI (Large Scale Integrated Circuit) 22 on the side of the reader/writer using the non-contact IC card method are mounted on a multilayer printed circuit board 21. Further, printed circuit board antennas 23 and 24, an LSI 25 on the side of the card using the non-contact IC card method, and the module controller CNT are mounted on the multilayer printed circuit board 21.

Figure 8:
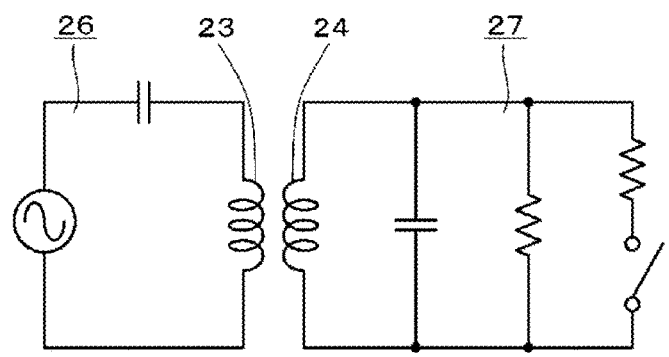
FIG. 8 is a diagram showing a circuit configuration of a first insulator in the embodiment.

As conceptually shown in FIG. 8, in the non-contact IC card method, for example, a transmission signal for a card unit 27, which has a carrier wave amplitude of 2 to 13 Vop and a degree of modulation of approximately 10%, is formed from the antenna 23 of a reader/writer unit 26. The transmission signal is transmitted from the antenna 23 to the antenna 24 of the card unit 27. In the antenna 24, the received signal is a high-frequency signal having a carrier wave amplitude of 2 to 13 Vop and a degree of modulation of approximately 10%, for example. By smoothing the received signal, a power source in the card unit 27 is formed. The power consumption in the card unit 27 is sufficiently small.

Figure 9:
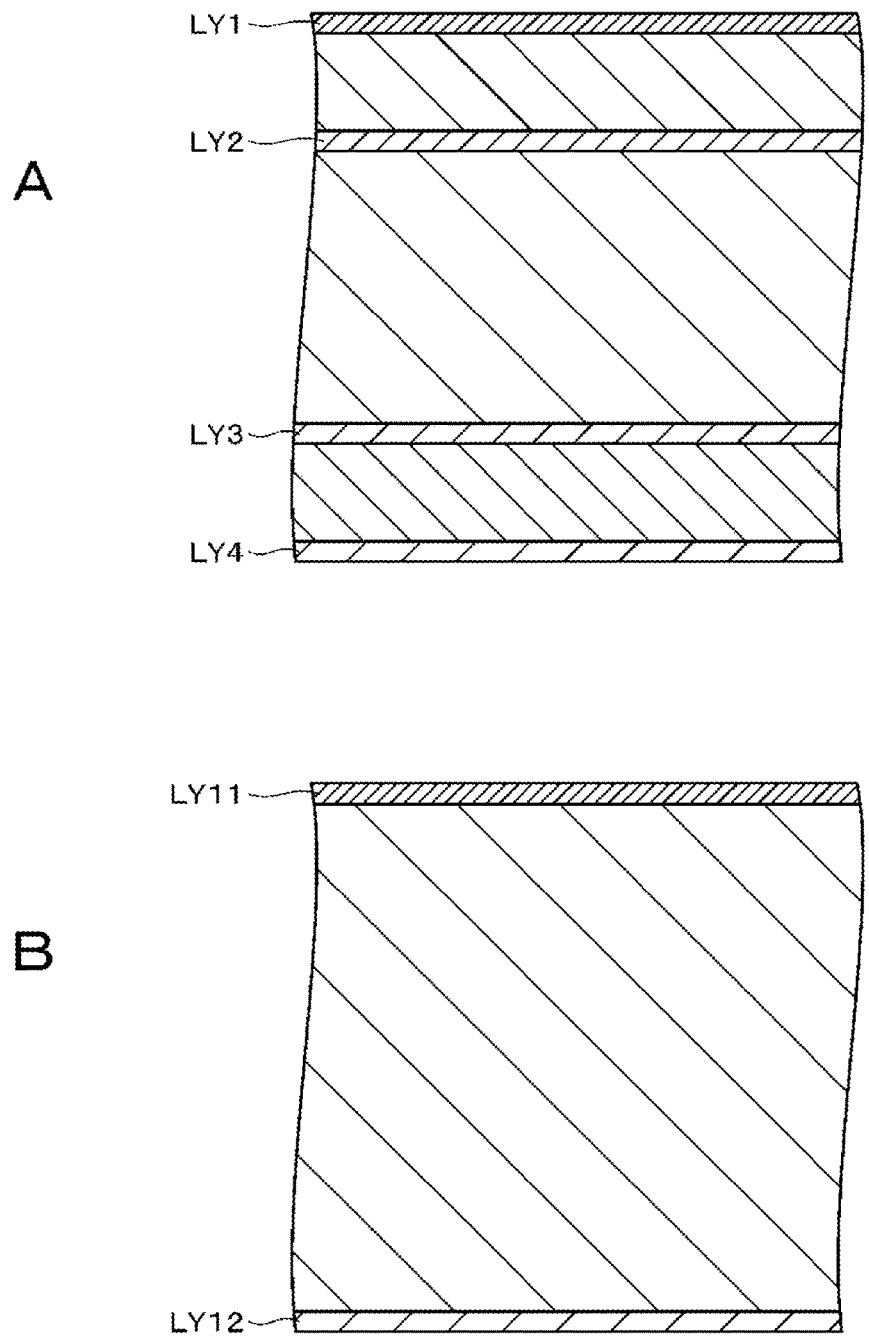
FIG. 9 Part A of FIG. 9 and Part B of FIG. 9 are diagrams for describing a specific example of a printed circuit board antenna in the embodiment.

An example of the printed circuit board antenna will be described. As the multilayer printed circuit board 21 on which the antenna is formed as a conductive pattern, a four-layered printed circuit board including four wiring layers LY1 to LY4 is used as shown in Part A of FIG. 9. Alternatively, as shown in Part B of FIG. 9, a two-layered printed circuit board including two wiring layers LY11 and LY12 is used.

Figure 10:
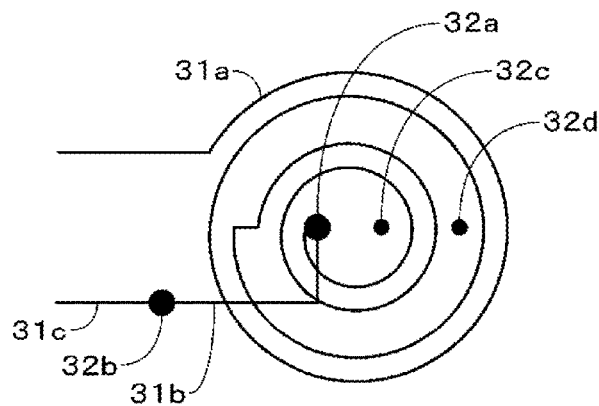
FIG. 10 Part A of FIG. 10 and Part B of FIG. 10 are cross-sectional views for describing a two-layer wiring substrate and a four-layer wiring substrate in the embodiment.
Figure 10:
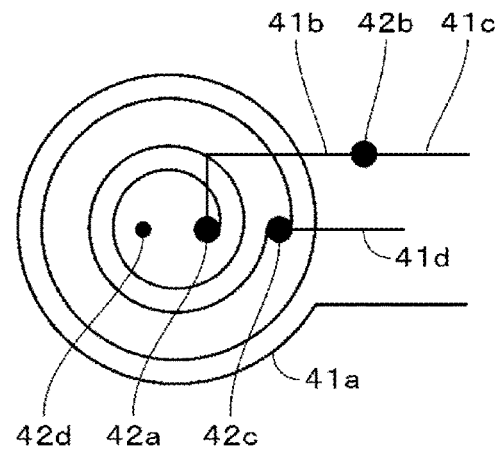

As shown in Part A of FIG. 10, the primary side antenna 23 (side of reader/writer) is formed of a spiral pattern 31a, a linear pattern 31b, and a linear pattern 31c. The spiral pattern 31a is formed on the fourth wiring layer LY4 of the four-layered printed circuit board, and the end portion of the central portion of the pattern 31a is connected to a land 32a of the third wiring layer LY3 via a land and a through hole. The linear pattern 31b is formed between the land 32a and the land 32b. The land 32b is connected to the linear pattern 31c via a through hole and a land of the third wiring layer LY3. End portions of the patterns 31a and 31c are connected to a connector (not shown).

As shown in Part B of FIG. 10, the secondary side antenna 24 (side of card) is formed of a spiral pattern 41a, a linear pattern 41b, a linear pattern 41c, and a linear pattern 41d. The spiral pattern whose one end is connected to a connector (not shown) is formed in the first wiring layer LY1 of the four-layered printed circuit board. It is connected to the linear pattern 41b via a land 42a, a through hole, and a land of the second wiring layer LY2. One end of the pattern 41b is connected to a land of the first wiring layer LY1 via a land 42b and a through hole. One end of the linear pattern 41c is connected to this land of the first wiring layer LY1. The other end of the linear pattern 41c is connected to a connector (not shown). Further, one end of the linear pattern 41d is connected to a land 42c connected to the spiral pattern 41a. The other end of the linear pattern 41d is connected to a reference potential point.

In the case where the patterns intersect with each other, patterns of different wiring layers form a printed circuit board antenna. In order to connect the different wiring layers to each other, a through hole and land are used. As a result, unnecessary lands 32c and 32d are formed in the fourth wiring layer as shown in Part A of FIG. 10, and an unnecessary land 42d is formed in the first wiring layer.

It may be possible to use a jumper line instead of forming the above-mentioned pattern in another wiring layer of the printed circuit board. Specifically, a jumper line is used instead of the pattern 31b in Part A of FIG. 10 and the patterns 41b and 41d in Part B of FIG. 10. In this case, it is possible to use a two-layered printed circuit board, it is unnecessary to form a through hole, and it is possible to prevent an unnecessary land from being formed. By not forming a through hole, it is possible to improve the dielectric strength of the printed circuit board.

The first insulator ISA insulates the primary side antenna from the secondary side antenna with the printed circuit board. Therefore, in the first insulator ISA of the present technology, direct-current insulation voltage of approximately 1000 V is possible. Further, there are advantages of being capable of performing bidirectional communication and electric power transmission and it is possible to reduce the cost.

The second insulator ISB has a function of insulating the module controller CNT from the control box ICNT. Specifically, it has a function of insulating the communication unit COM of the power storage module MOD from the control box ICNT in the line Lp for a power source. Although the second insulator ISB uses an insulation transformer system using a transformer as an example, it is not limited thereto. Further, insulators similar to the second insulator may be provided in the lines L1 and L2 for communication. The insulation withstand voltage of the second insulator ISB is larger than the insulation withstand voltage of the first insulator ISA and larger than the output of the power storage system 1A. In this embodiment, the output of the power storage system 1A is approximately 3280 V. Therefore, the insulation withstand voltage of the second insulator ISB is set to 4 kV (4000 V). By employing a configuration in which the second insulator ISB is provided, it is possible to prevent a situation where the output of the power storage system 1A is leaked to the power storage module MOD via the line Lp for a power source in the case where an abnormality has occurred, for example, which damages the communication unit COM and the module controller CNT, for example.

(Regarding Cell Balance)

Figure 6:
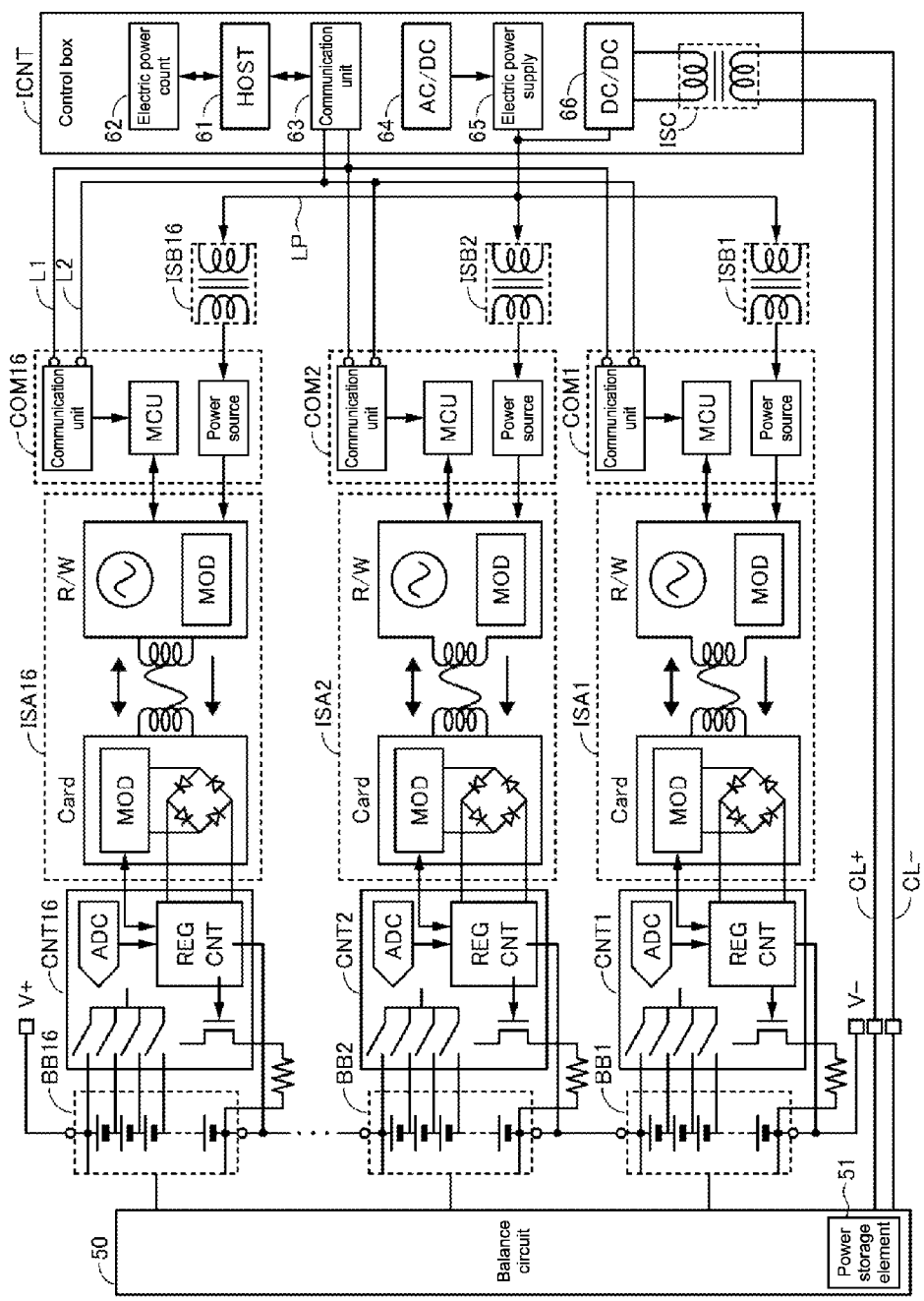
FIG. 6 is a diagram for describing a detailed configuration of the string in the embodiment.

As shown in FIG. 6, a balance circuit 50 is connected to the power storage modules MOD1 to MOD16. The balance circuit 50 is a circuit that controls voltage of the power storage modules MOD1 to MOD16 to be equal. Active bottom cell balance control and active top cell balance control can be exemplified as balance control performed by the balance circuit 50. The active bottom cell balance control is control to transfer electric power from a (highest potential) battery block group BB having largest remaining capacity to another (lowest potential) battery block group BB having smallest capacity when a certain battery block group BB reaches a use lower limit voltage to thereby make the remaining capacity approximately equal. The active top cell balance control is control to transfer electric power from a (highest potential) battery block group BB having largest capacity to another (lowest potential) battery block group BB having smallest capacity when a certain battery block group BB reaches a use upper limit voltage to thereby make the remaining capacity approximately equal. Although a passive method can also be applied as the balance control, the active method is favorable because it is capable of effectively using the capacity as compared with the passive method.

Figure 11:
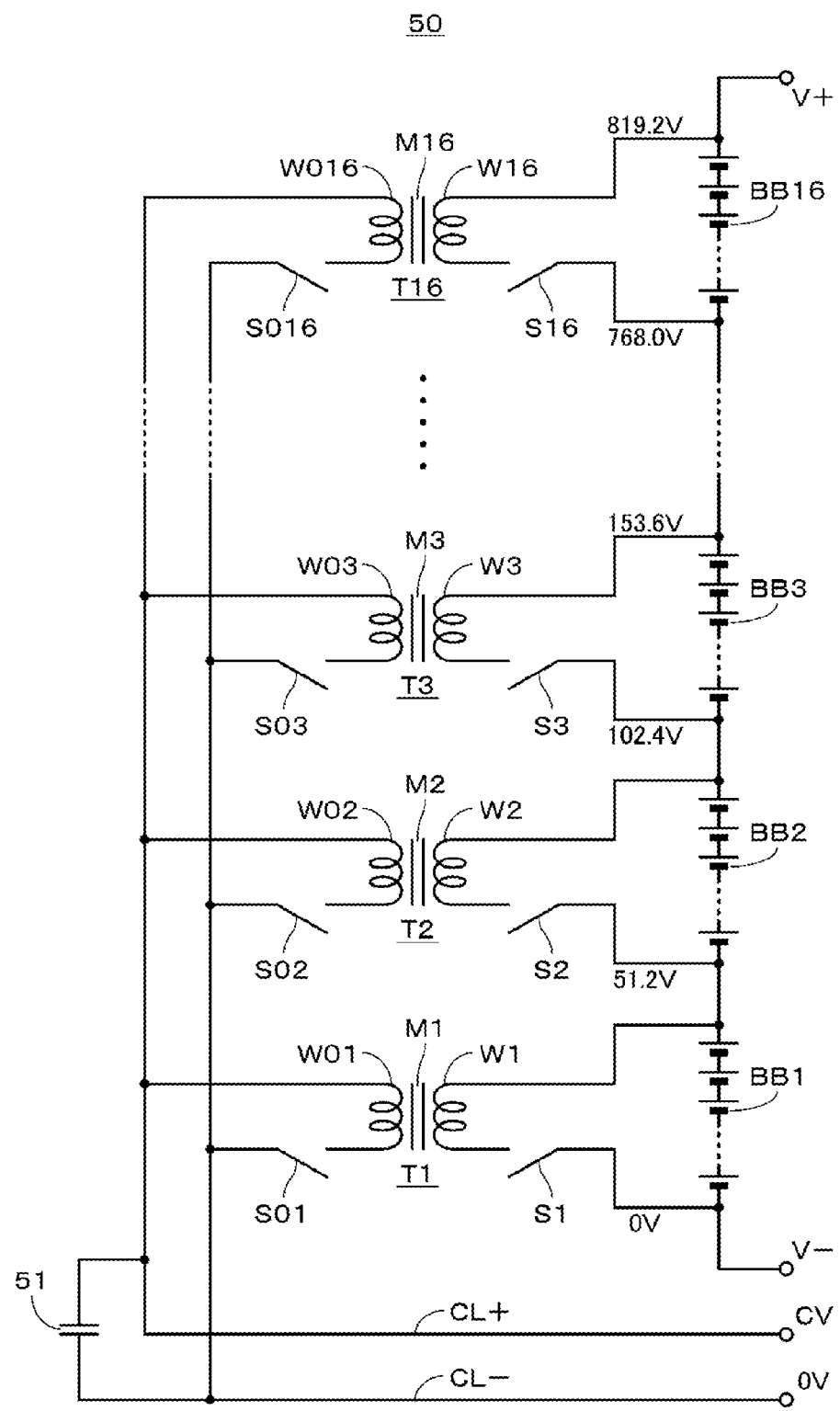
FIG. 11 is a diagram for describing a configuration example of a balance circuit in the embodiment.

FIG. 11 is a diagram showing a configuration example of the balance circuit 50 in the embodiment. As shown in FIG. 11, a primary side coil W1, a secondary side coil W01, and a magnetic core M1 constitute a flyback transformer T1. The primary side coil W1 and a switch S1 are connected in series and the secondary side coil W01 and a switch S01 are connected in series. Similarly, primary side coils W2 to W16, secondary side coils W02 to W016, and magnetic cores M2 to M16 respectively constitute flyback transformers T2 to T16. The primary side coils W2 to W16 and switches S2 to S16 are respectively connected in series. The secondary side coils W02 to W016 and switches S02 to S016 are respectively connected in series.

The series circuit of the primary side coil W1 and the switch S1 of the flyback transformer T1 is connected to a positive side and a negative side of a battery block group BB1 of the power storage module MOD1. The series circuits of the other primary side coils W2 to W16 and the switches S2 to S16 are respectively connected to a positive side and a negative side of battery block groups BB2 to BB16 of the corresponding power storage modules MOD2 to MOD16.

The balance circuit 50 includes a power storage element 51. This power storage element 51 generates common power source voltage CV. The common power source voltage CV is voltage lower than 819.2 V of the total voltage of the series connection of the battery block group. Favorably, it is set to be not more than the voltage of substantially one third of the withstand voltage of the secondary side switch. For example, it is set to be a value substantially equal to the unit voltage (51.2 V) of the battery block group. The potential of the common power source voltage CV is controlled by controlling the total discharge current and the total charge current so that it does not overflow, is not exhausted, and is desired voltage.

The power storage element 51 is, for example, a battery or capacitor. With the power storage element 51, one common power source line CL+ is the common power source voltage CV and the other common power source line CL- is 0 V. The common power source line CL- is another power supply that is not connected to a power source (V-) of series connection of the battery block groups of a plurality of power storage modules. Note that the common power source line CL- may be connected to the power source V-. One ends of the divided secondary side coils W01 to W016 are connected to the common power source line CL+, and the other ends of the divided secondary side coils W01 to W016 are respectively connected to the common power source line CL-via the switches S01 to S016.

Figure 12:
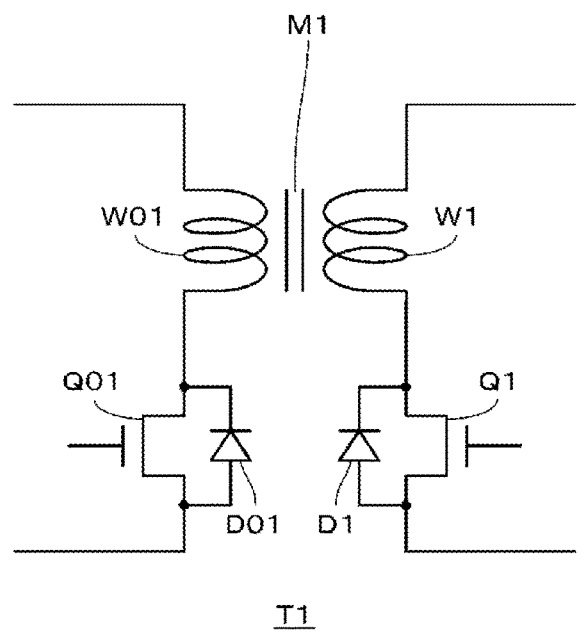
FIG. 12 is a diagram showing a specific example of a switch in the embodiment.

The switches S0 to S16 and the switches S01 to S016 are each constituted of a MOSFET, for example. As shown in FIG. 12, for example, the switch S01 of the flyback transformer T1 is constituted of a MOSFET Q01 and a diode D01 connected between the drain and the source of the MOSFET Q01, and the switch S1 is constituted of a MOSFET Q1 and a diode D1 connected to the drain and the source of the MOSFET Q1. The module controller CNT controls turning on/off of the switch under the control of the control unit (HOST) of the control box ICNT. The control box ICNT receives information on the voltage monitoring result from the module controller CNT of each power storage module and generates a control signal (pulse signal). Note that instead of the MOSFET, a semiconductor switching element such as an IGBT (Insulated Gate Bipolar Transistor) may be used. Note that through the switch (constituted of a MOSFET and a diode connected to the drain and the source of the MOSFET), current automatically flows via the diode without the control signal (automatic turning on of the switch) in the case where the current flows from the source to the drain.

To the series circuit of the secondary side coils W01 to W016 and the switches S01 to S016, the common power source voltage CV is applied. For example, by setting the common power source voltage CV to the voltage (51.2 V) similar to that applied to the primary side coil and the switch, the withstand voltage of the secondary side switch S01 to S016 can be approximately 154 V. The value of such withstand voltage is not so high for the semiconductor switches constituting the secondary side switches S01 to S016, making it easy to configure the balance circuit 50.

In the flyback transformers T1 to T16, the winding ratio of the primary side coil to the secondary side coil is not limited to one, but the phase on the primary side is opposite to the phase on the secondary side. Further, the flyback transformers T1 to T16 are capable of bidirectionally transmitting electric power. Therefore, the representation of the primary side and the secondary side is given for convenience, and it is possible to perform both of electric power transmission from the primary side to the secondary side and electric power transmission from the secondary side to the primary side.

Taking the flyback transformer T1 as an example, when the switch S1 is turned on from the state where the switches S1 and S01 are off, current flows through the coil W1 and the magnetic core M1 is magnetized. During the period when the switch S1 is turned on, current that increases with time flows through the coil W1. Next, when the switch S1 is turned off and the switch S01 is turned on, current flows through the coil W01 via the switch S01 because the magnetic core is being magnetized. This current is current that decreases with time. The same applies to operations of the other flyback transformers. The flyback transformer has a function as a coupled inductor.

In the active top cell balance control in the configuration shown in FIG. 11, current is moved from the battery block group having the highest voltage to the power storage element 51 by controlling the primary side switch. Further, current is moved to the battery block group of the power storage module having the lowest voltage by controlling the secondary side switch. As described above, in the balance circuit 50 according to the present technology, current is moved via two stages of bidirectional flyback transformers.

Figure 13:
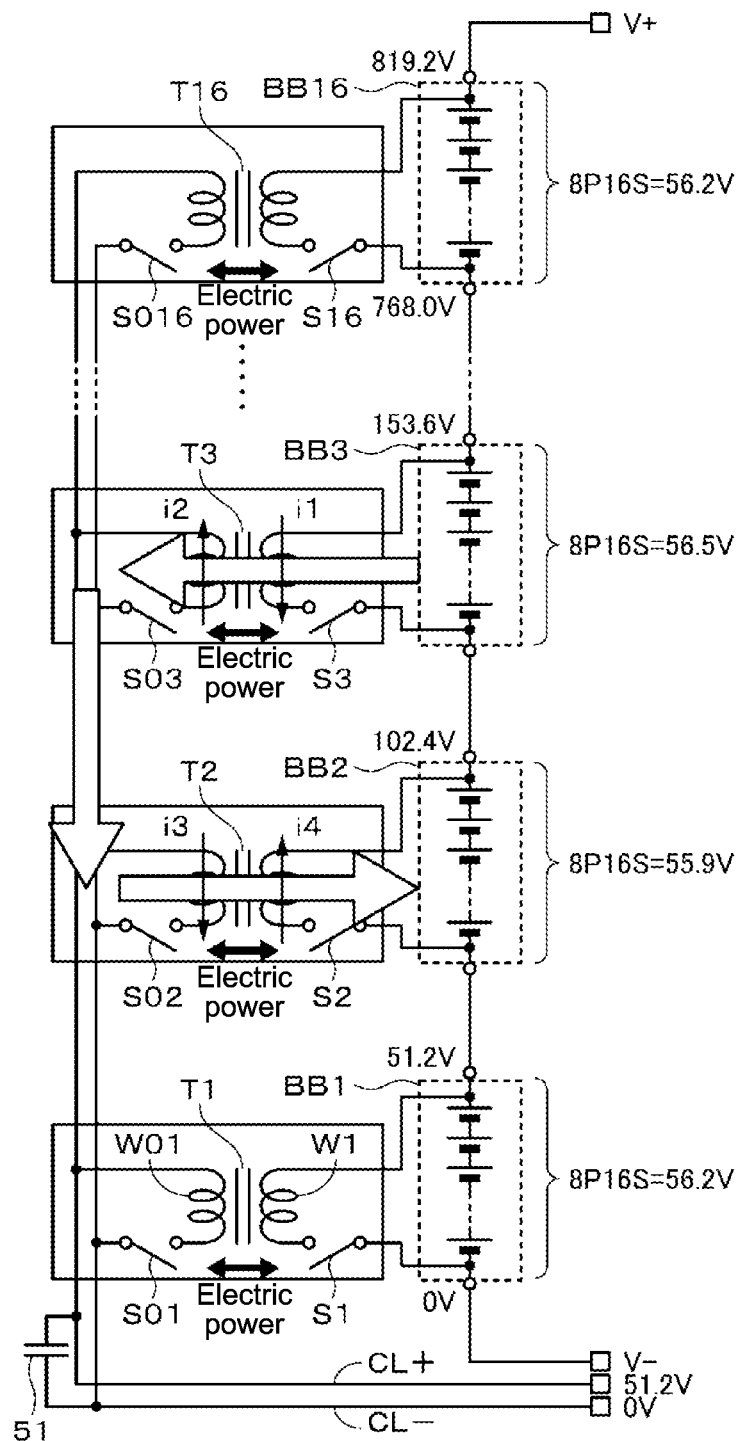
FIG. 13 is a diagram for describing an example of balance control.

As an example, as shown in FIG. 13, an operation in the case where the voltage of the battery block group BB3 is the highest, i.e., 56.5 V and the voltage of the battery block group BB2 is the lowest, i.e., 55.9 V will be described. First, the switch S3 of the flyback transformer T3 is turned on and current flows through the primary side coil W3 with the battery block group BB3 as a current source. Next, the switch S3 is turned off and the switch S03 is turned on. By the electromagnetic energy, current flows through the secondary side coil W03 and the power storage element 51 is charged.

Next, the switch S03 is turned off, the switch S02 of the flyback transformer T2 is turned on, and current flows through the secondary side coil W02 by the power storage element 51. Next, the switch S02 is turned off, the switch S2 is turned on, the battery block group BB2 is charged by the current that flows through the primary side coil W2. In this way, the active top cell balance control is performed.

The control box ICNT as an upper-level controller monitors voltage of each power storage module MOD. When the batteries of the detected power storage modules become equal to each other, the control box ICNT performs control to stop an inter-module balance control operation. When a difference in voltage occurs between the power storage modules, the inter-module balance control operation is started. Note that, although the active top cell balance control has been exemplified in the above-mentioned example, the active bottom cell balance control may be performed, and voltage of the power storage modules MOD1 to MOD16 is made equal by performing similar switch control.

Figure 14:
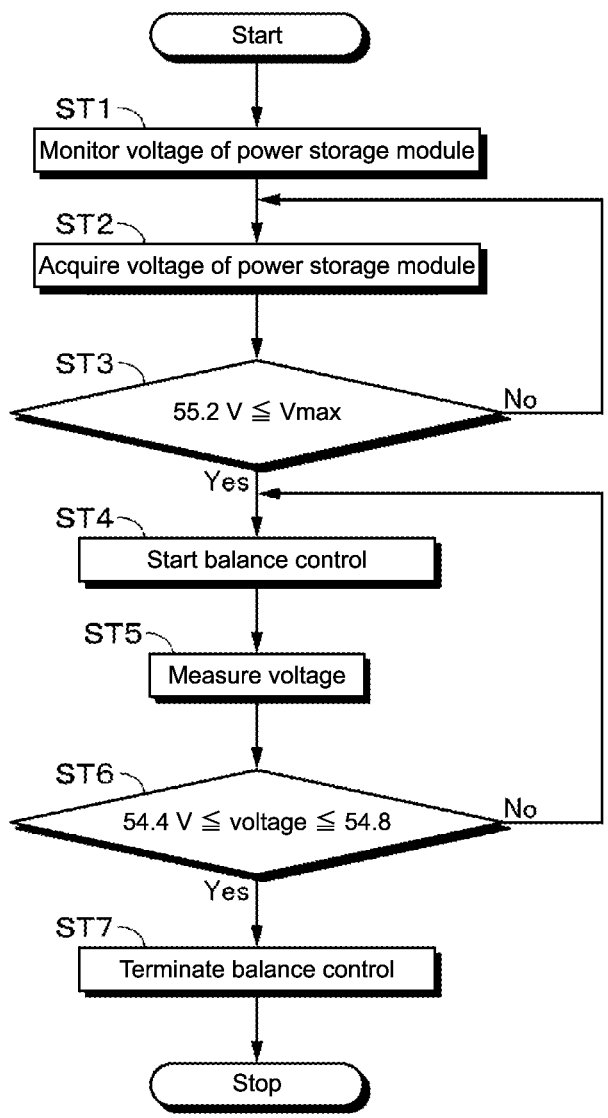
FIG. 14 is an example of a flowchart for describing a flow of processing of the balance control.

FIG. 14 is an example of a flowchart for describing an example of a flow of processing of the balance control (e.g., active top cell balance control). First, in Step ST1, the voltage of the power storage module MOD is monitored by the module controller CNT. Note that this processing is periodically performed, for example. Then, the processing proceeds to Step ST2. In Step ST2, the control box ICNT acquires voltage of each power storage module MOD periodically transmitted from the module controller CNT.

In Step ST3, whether or not maximum voltage Vmax of voltage of each power storage module MOD is equal to or larger than a threshold (e.g., 55.2 V) is determined. If the maximum voltage Vmax is smaller than the threshold, the processing returns to Step ST2 and the determination processing is repeated. If the maximum voltage Vmax is equal to or larger than the threshold, the processing proceeds to Step ST4.

In Step ST4, the control box ICNT instructs the power storage module MOD to start the balance control and the balance control is performed by sequentially turning on/off a predetermined switch. Note that details of the balance control have already been described showing the examples, and hence a duplicated description will be omitted. Then, the processing proceeds to Step ST5.

In Step ST5, the control box ICNT acquires voltage measured in each power storage module MOD. Then, the processing proceeds to Step ST6. In Step ST6, the control box ICNT determines whether or not the voltage of all the power storage modules MOD is within a predetermined range, for example, within a range of 54.4 V or more and 54.8 V or less. If the voltage of all the power storage modules MOD is not within the predetermined range, the processing returns to Step ST4 and the balance control is continued. If the voltage of all the power storage modules MOD is within the predetermined range, the processing proceeds to Step ST7 and the balance control is terminated.

(Regarding Control Box)

Referring back to FIG. 6, the control box ICNT will be described. The control box ICNT is connected to the power storage element 51 via a common power source line CL. A configuration in which voltage is supplied to the control box ICNT from the power storage element 51 is employed. The control box ICNT includes, for example, a control unit (HOST) 61, an electric power counter 62, a communication unit 63, an AC/DC converter 64, an electric power supply section 65, a DC/DC converter 66, and an insulator ISC as a third insulator.

The respective configurations will be schematically described. The control unit 61 controls the operation of the control box ICNT to control each module controller CNT. The electric power counter 62 stabilizes the output power of the power storage system 1A. The electric power supplied to the load 2 is re-calculated, for example. The communication unit 63 communicate with the communication unit COM of the module controller CNT. The AC/DC converter 64 converts alternating-current electric power into direct-current electric power in a manner that depends on needs.

The electric power supply section 65 appropriately converts power source voltage supplied from the DC/DC converter 66 and supplies an alternating-current signal to the power storage module MOD. The DC/DC converter 66 generates power source voltage (e.g., 5 V) of the module controller CNT from the common power source voltage CV input from the power storage element 51. The power source voltage generated by the DC/DC converter 66 is supplied to the power storage module MOD via the line Lp for a power source. In addition, the power source voltage is supplied to the module controller CNT via the second insulator ISB, the communication unit COM, and the first insulator ISA.

The insulator ISC is provided between the power storage element 51 and the control box ICNT in the common power source line CL. Thus, the insulation withstand voltage (e.g., 4 kV) similar to that of the second insulator ISB of the module controller CNT is possible. By providing the insulator ISC, a situation where the output of the power storage system 1A is leaked to the control box ICNT via the common power source line CL due to an abnormality or the like of the power storage system 1A, which damages the control box ICNT, for example, is prevented.

The control box ICNT is connected to be capable of communicating with the integrated controller INC. A communication line between the control box ICNT and the integrated controller INC is connected as a parallel communication line as in the communication line between the control box ICNT and the power storage module MOD, for example. With this, communication with another string STR can be ensured even if a failure occurs in one string STR.

(Regarding Integrated Controller)

The integrated controller INC will be schematically described. The integrated controller INC includes a communication unit, a control unit, and the like. The integrated controller INC is capable of communicating with the control box ICNT and a control apparatus of the load.

Note that the control box ICNT may generate power source voltage of the integrated controller INC from the common power source voltage CV and may supply it. In this case, the integrated controller INC may include an insulator as a fourth insulator that insulates the integrated controller INC from the control box ICNT. By setting insulation withstand voltage of this insulator to be similar to that of the second insulator ISB and the insulator ISC, it is possible to prevent a situation where the output of the power storage system 1A is leaked to the integrated controller INC due to an abnormality or the like of the power storage system 1A, which damages the integrated controller INC, for example.

Hereinabove, in the first embodiment, high voltage can be output by connecting many power storage modules in series. Further, the lithium ion secondary battery is used as an example of the secondary battery. Therefore, there is no fear that a decrease in discharge voltage and an increase in charge voltage due to connection resistance in the case where many power storage modules are connected in series may occur in comparison with a lead storage battery. Further, the power storage system is directly coupled to a supply system and the output of the power storage system is supplied without a booster circuit and the like. There is a fear that the booster circuit and the like corresponding to high electric power may be increased in size and the entire system may be increased in size. However, in the embodiment, the booster circuit is not used. Thus, downsizing of the system can be realized. Further, it is possible to prevent electric power loss in the booster circuit and the like. Further, electric power of the power storage system is connected and supplied as it is, and hence voltage fluctuation on the side of the power storage system hardly occurs along with power fluctuation of the load. It is possible to minimize voltage fluctuation on the side of the power storage system in the case where a load having high electric power is connected.

2. Second Embodiment

Next, a second embodiment will be described. Unless otherwise stated, the matter described in the first embodiment can be applied to the second embodiment.

Figure 15:
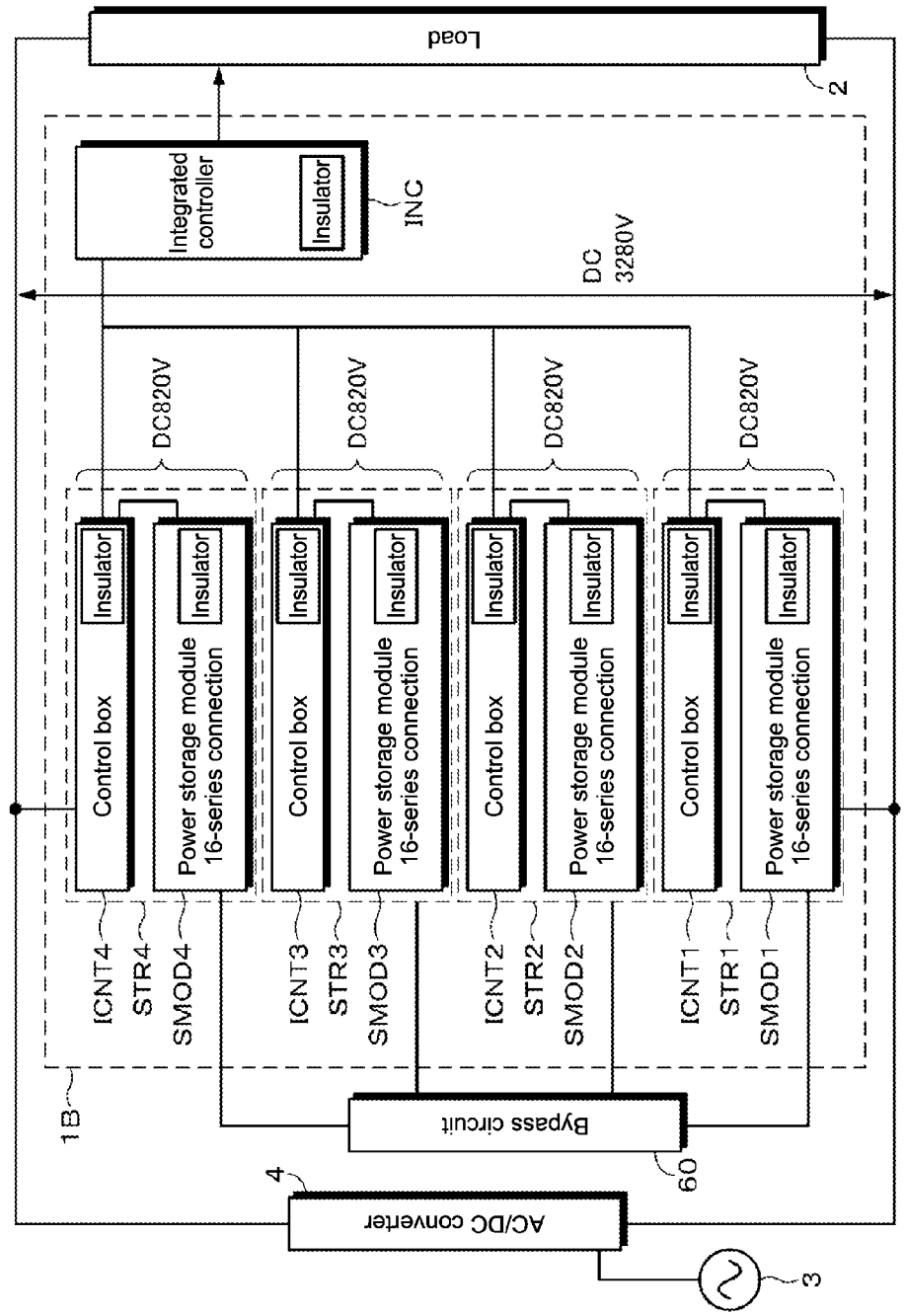
FIG. 15 is a block diagram for describing a configuration example of a power storage system and the like in a second embodiment.

FIG. 15 shows configurations of a power storage system 1B and the like in the second embodiment of the present technology. The power storage system 1B is obtained by adding a bypass circuit 60 to the configuration of the power storage system 1A in the first embodiment.

Schematically describing the second embodiment, in the second embodiment, only output of normal strings STR is supplied to the load 2 via the bypass circuit 60 in the case where an abnormality has occurred in a certain string STR. At this time, current flowing through the power storage module MOD is increased without departing from a range of a predetermined upper limit value and the amount of electric power output is maintained.

(Regarding Bypass Circuit)

Figure 16:
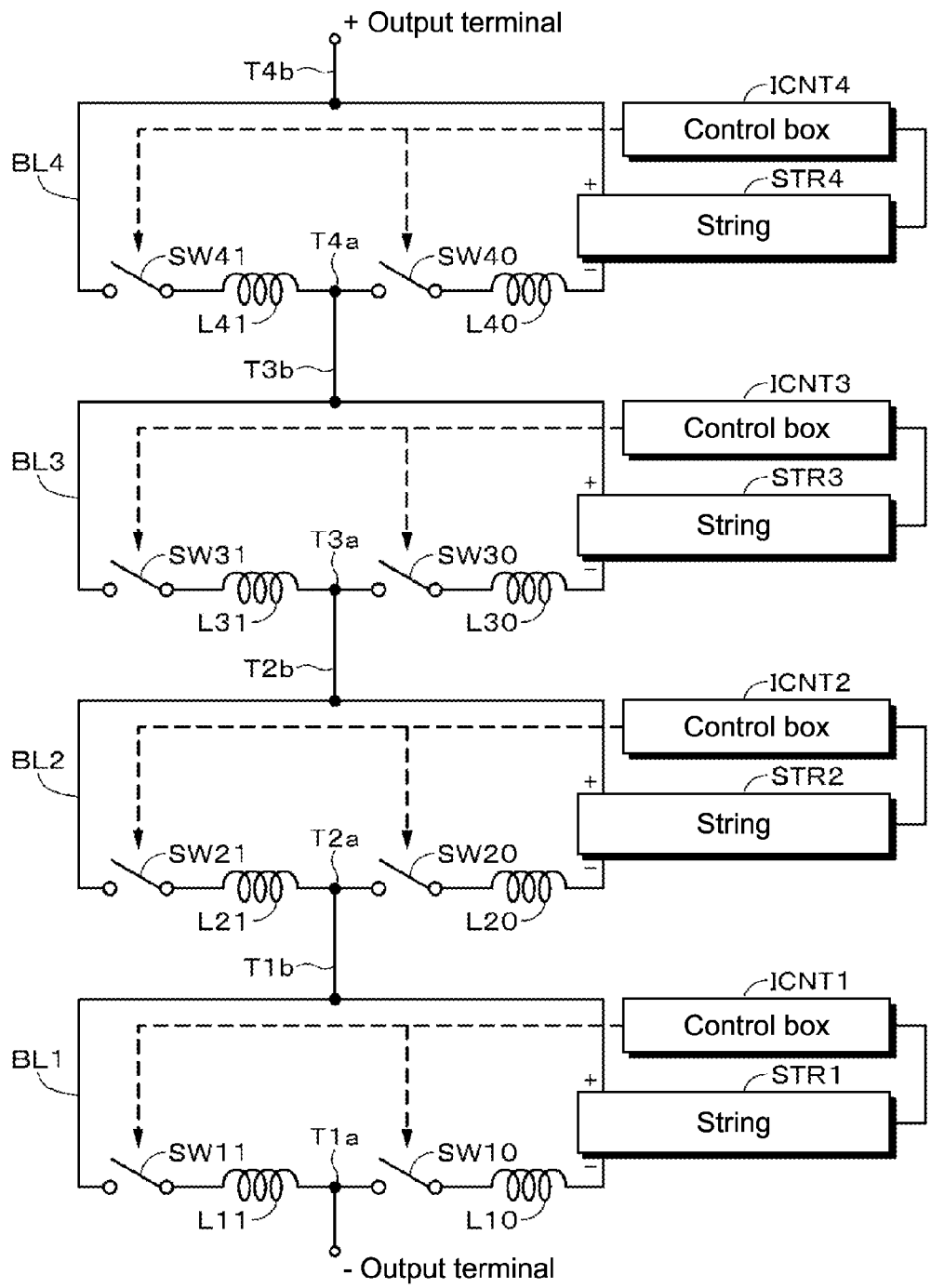
FIG. 16 is a diagram for describing a configuration example of a bypass circuit in the second embodiment.

An example of the bypass circuit 60 will be described with reference to FIG. 16. A − (minus) output terminal of a power supply line is connected to a minus side of a power line of the string STR1 via a connection point T1a, a switch SW10, and a coil L10. A + side of the power line of the string STR1 is connected to a minus side of a power line of the string STR2 via a connection point T1*b*, a connection point T2*a* connected to the connection point T1*b*, a switch SW20, and a coil L20. A + side of the power line of the string STR2 is connected to a minus side of a power line of the string STR3 via a connection point T2*b*, a connection point T3*a* connected to the connection point T2*b*, a switch SW30, and a coil L30. A + side of the power line of the string STR3 is connected to a minus side of a power line of the string STR4 via a connection point T3*b*, a connection point T4*a* connected to the connection point T3*b*, a switch SW40, and a coil L40. A + side of the power line of the string STR4 is connected to a +(plus) output terminal of the power supply line via a connection point T4*b*.

On the other hand, a bypass route BL1 is formed as a path branching from the connection point T1*a* and connected to the connection point T1*b*. A coil L11 and a switch SW11 are provided between the connection point T1*a* and the connection point T1*b* in the bypass route BL1 from the side of the connection point T1*a*. Further, a bypass route BL2 is formed as a path branching from the connection point T2*a* and connected to the connection point T2*b* and a coil L21 and a switch SW21 are provided between the connection point T2*a* and the connection point T2*b* in the bypass route BL2 from the side of the connection point T2*a*.

Further, a bypass route BL3 is formed as a path branching from the connection point T3*a* and connected to the connection point T3*b* and a coil L31 and a switch SW31 are provided between the connection point T3*a* and the connection point T3*b* in the bypass route BL3 from the side of the connection point T3*a*. Further, a bypass route BL4 is formed as a path branching from the connection point T4*a* and connected to the connection point T4*b* and a coil L41 and a switch SW41 are provided between the connection point T4*a* and the connection point T4*b* in the bypass route BL4 from the side of the connection point T4*a*.

On/off of the switches SW10 and 11 is controlled by a control box ICNT1. On/off of the switches SW20 and 21 is controlled by a control box ICNT2. On/off of the switches SW30 and 31 is controlled by a control box ICNT3. On/off of switches SW40 and 41 is controlled by a control box ICNT4. Note that each coil is provided for the purpose of removing alternating-current components and is not necessarily required.

Figure 17:
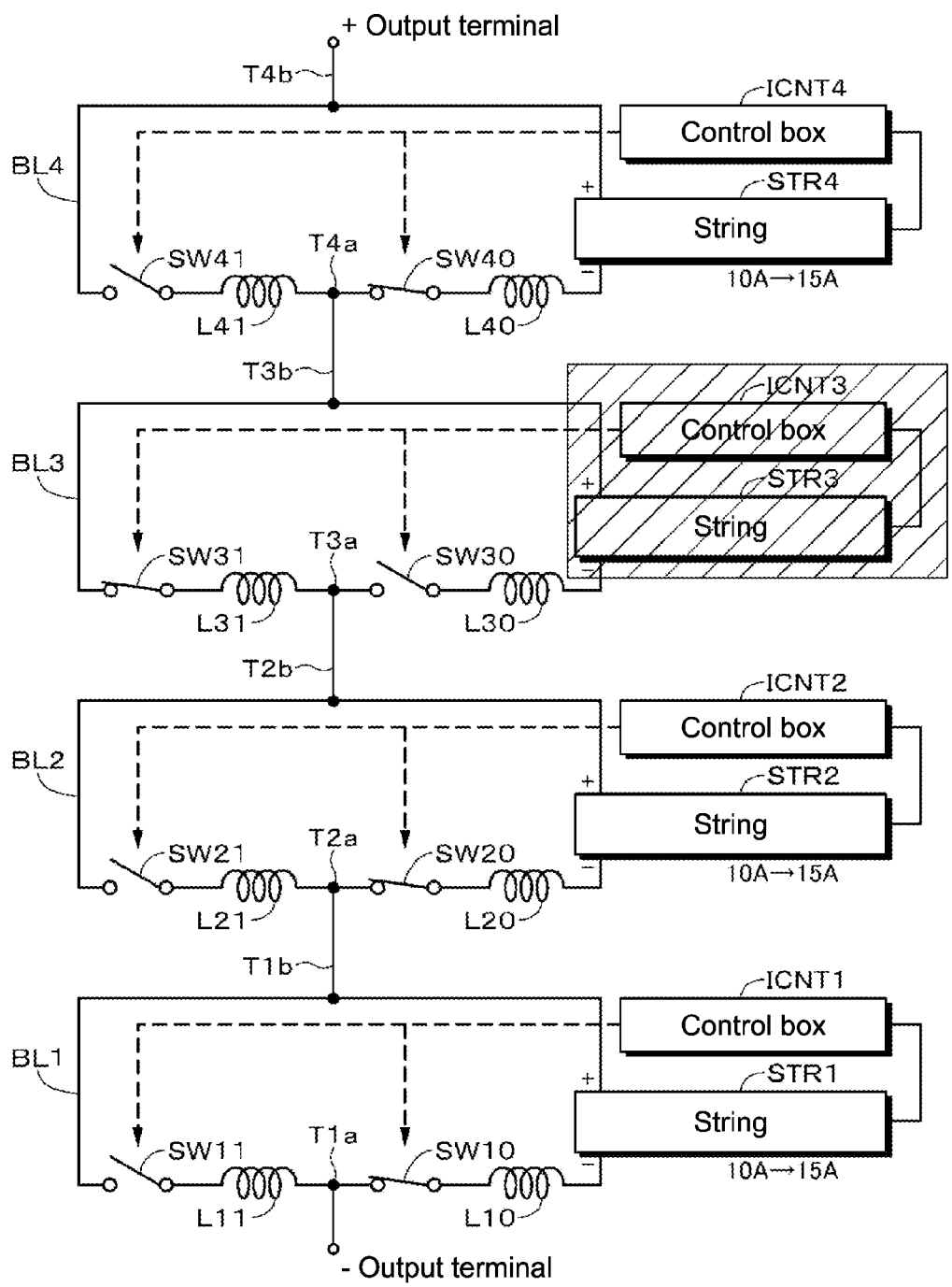
FIG. 17 is a diagram for describing an operation example of the bypass circuit in the second embodiment.

An operation of the bypass circuit 60 will be described. In the case where each string STR is normal, the switches SW10, 20, 30, and 40 are turned on and switches SW11, 21, 31, and 41 are turned off. With this, the output of all the strings STR is supplied to the load 2. Here, for example, as shown in FIG. 17, it is assumed that an abnormality has occurred in the string STR3. In this case, the control box ICNT3 notifies the integrated controller INC of the abnormality and the control box ICNT3 turns off the switch SW30 and turns on the switch SW31 according to the control of the integrated controller INC. With this, in other words, the string STR3 is skipped via the bypass route BL3, that is, only the output of the normal strings STR is selectively supplied to the load 2.

Here, the output of the power storage system 1B is lowered by only simply separating the string STR3. Assuming that the output of each string STR is 820 V, the output of the power storage system 1B is lowered from 3280 V to 2460 V (3280 V−820 V). In view of this, in the second embodiment, current flowing through the power storage modules MOD of the normal strings STR is increased without departing from the range of the upper limit value and electric power supplied to the load 2 is made constant.

A description will be made using a specific example. The integrated controller INC notified of the abnormality of the string STR3 instructs the control box ICNT3 to turn on/off of the switches SW30 and 31. In addition, the integrated controller INC instructs the control boxes ICNT1, 2, and 4 of the normal strings STR1, 2, and 4 to increase the discharge current.

A more detailed description will be made exemplifying the string STR1. The control box ICNT1 instructs the power storage module MOD that constitutes the string STR1 to increase the discharge current. Assuming that usual discharge current is 0.5 C, the control box ICNT1 sets the discharge current to 0.75 C. Here, C (Capacity) is one of units of a magnitude of charge/discharge current here and, for example, 1 C is a magnitude of charge current or discharge current with which charge or discharge is terminated one time. The magnitude of the discharge current can be changed by connecting a variable resistance to a current path of the power storage module MOD and changing a resistance value, for example.

Assuming that, as an example of the numerical value, the discharge current of the power storage module MOD in each string STR is 10 A (ampere) in the usual case, electric power of approximately 32 kW (3200 V×10 A) can be supplied to the load. In the case where an abnormality has occurred in the string STR3, the voltage drops to approximately 2400 V. However, by setting the discharge current of the power storage modules MOD in the normal strings STR1, 2, and 4 to 15 A, electric power of approximately 36 kW (2400 V×15 A) as in the usual case can be supplied to the load.

Also if abnormalities have occurred in the strings STR2 and 3, similar processing is performed. If abnormalities have occurred in the strings STR2 and 3, the voltage drops to approximately 1600 V. However, by setting the discharge current of the power storage modules MOD in the normal strings STR1 and 4 to 24 A (approximately 20 A is also possible), electric power of approximately 38 kW (1600 V×24 A) as in the usual case can be supplied to the load.

Figure 18:
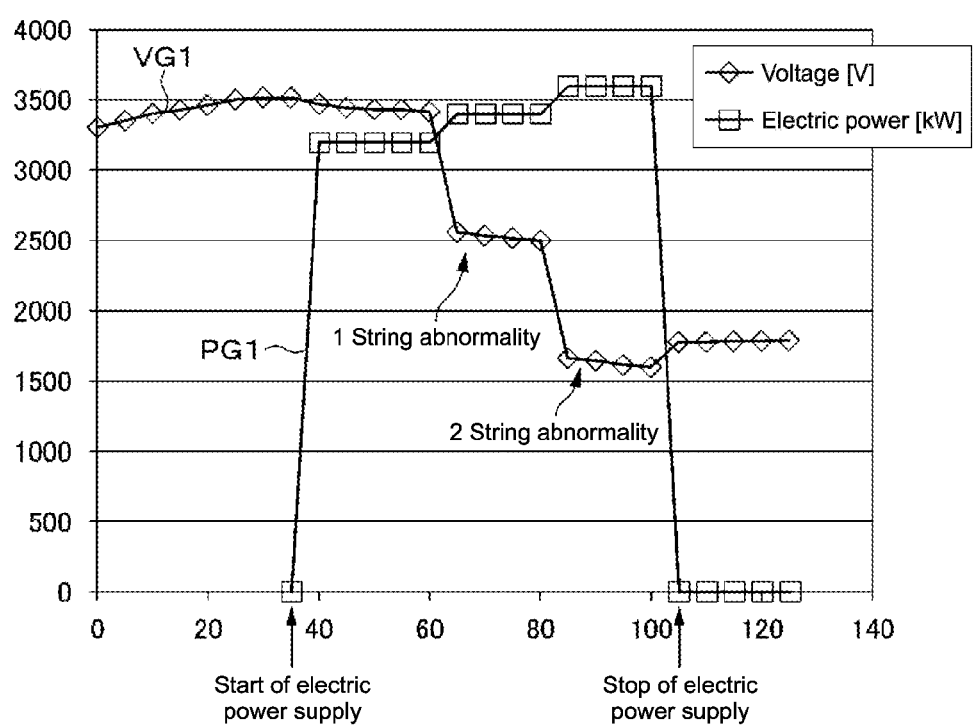
FIG. 18 is a graph for describing an example of effects in the second embodiment.

FIG. 18 graphically shows the above-mentioned control. In the figure, a graph VG1 shows output voltage of the power storage system 1B and a graph PG1 shows output voltage of supplied electric power of the power storage system 1B. In the case where all four strings STR that constitute the power storage system 1B are normal, the output voltage of the power storage system 1B is approximately 3200 V. Here, even in the case where an abnormality has occurred in one string STR after supply of electric power (start of electric power supply) to the load 2 is started, electric power substantially similar to that of the usual case can be supplied to the load by increasing the discharge current while operating other normal strings STR as described above. In addition, even in the case where abnormalities have occurred in two strings STR, electric power substantially similar to that of the usual case can be supplied to the load by further increasing the discharge current while operating other normal strings STR as described above.

Note that the upper limit value of the discharge current of the power storage module MOD is previously set in accordance with specifications. For example, a description will be made assuming that the upper limit value is 25 A. Also if abnormalities have occurred in the strings STR1, 2, and 3, the discharge current of the string STR4 is set to approximately 40 A, electric power (32 kW) similar to that of the normal case can be theoretically supplied to the load. However, 40 A exceeds the upper limit value. Therefore, in such a case, electric power supplied from the system 3 is supplied to the load 2 via the AC/DC converter 4 without supplying electric power to the load 2 only by the string STR4.

(Flow of Control)

Figure 19:
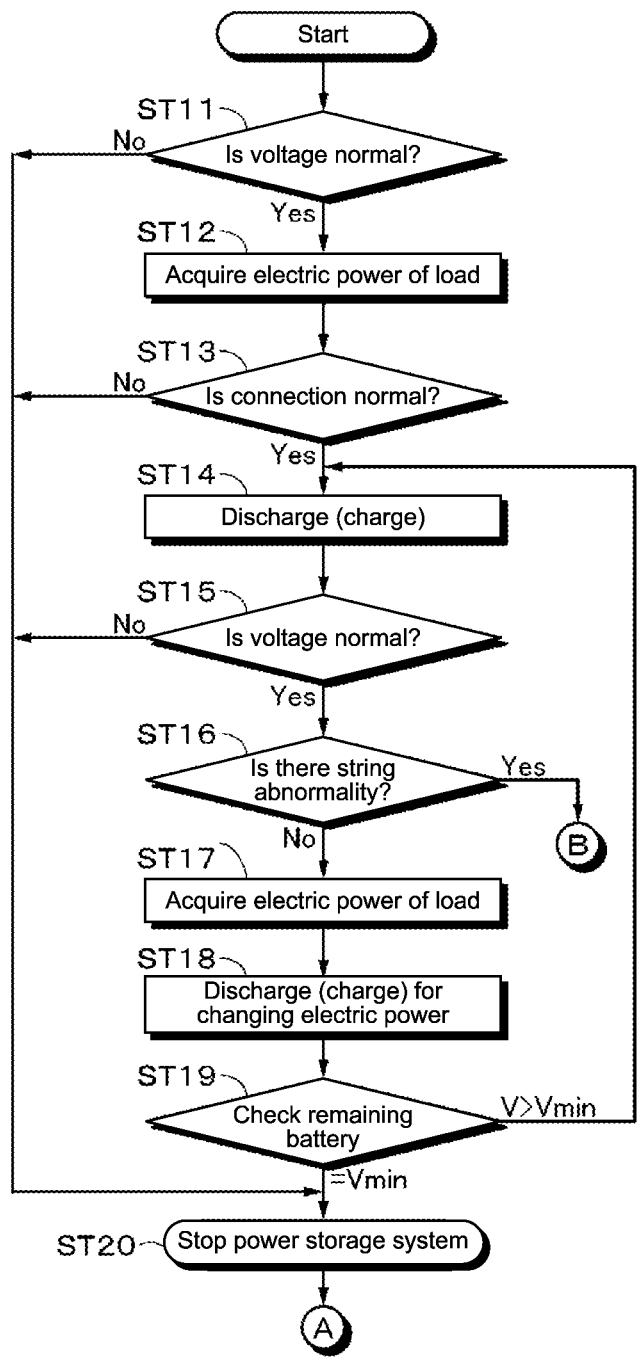
FIG. 19 is a flowchart for describing a flow of main processing in the second embodiment.

A flow of control will be described with reference to flowcharts of FIGS. 19, 20, 21, and 22. FIG. 19 is a flowchart showing a flow of main processing. In Step ST11, the integrated controller INC communicates with each control box ICNT and voltage of each power storage module MOD in the string STR is acquired. The voltage of each power storage module MOD is determined as being normal within a predetermined range and is otherwise determined as being abnormal. If it is determined as being abnormal, the processing proceeds to Step ST20 and the power storage system 1B is stopped. If the voltage of each power storage module MOD is determined as being normal, the processing proceeds to Step ST12.

In Step ST12, the integrated controller INC communicates with the load 2 and checks electric power required by the load 2. Then, the processing proceeds to Step ST13.

In Step ST13, whether or not connection between the strings STR, connection between the power storage system 1B and the load 2, and connection between the power storage modules MOD, and the like are normal is checked. If an abnormality has been found in the connection, the processing proceeds to Step ST20 and the power storage system 1B is stopped. If the connection is normal, the processing proceeds to Step ST14.

In Step ST14, discharging from the power storage system 1B is performed. Note that, although discharging is described as an example here, charging may be performed. Then, the processing proceeds to Steps ST16 and 17.

In Steps ST16 and 17, the integrated controller INC periodically checks whether or not the voltage of the power storage module MOD is within a predetermined range and checks whether or not there is a notification to the string STR from the control box ICNT, the notification indicating the fact that an abnormality has occurred. Examples of the abnormality of the string STR can include a sharp increase in temperature of the power storage module MOD that constitutes the string STR and damage such as breaking of a wire. In Step ST17, if the voltage of the power storage module MOD is sharply lowered, for example, and departs from the predetermined range, the processing proceeds to Step ST20 and the output of the power storage system 1B is stopped and electric power is supplied to the load 2 from the system 3. Further, if an abnormality has occurred in the string STR, the processing proceeds to processing to be described later. The voltage of the power storage module MOD is normal and the string STR is not abnormal, the processing proceeds to Step ST17.

In Step ST17, the integrated controller INC acquires and checks electric power of the load 2. This processing may be periodically performed. Then, the processing proceeds to Step ST18.

In Step ST18, if power required by the load 2 fluctuates, processing of changing electric power output from the power storage system 1 and performing discharging in a manner that depends on needs is performed. For example, the electric power output by the power storage system 1B is changed by increasing or reducing the discharge current of the power storage module MOD. Then, the processing proceeds to Step ST19.

In Step ST19, a remaining amount of the power storage module MOD is periodically checked. If minimum voltage V of the voltage of the power storage modules MOD is larger than a predetermined value Vmin, the processing proceeds to Step ST14 and discharging is continued. If the voltage V reaches the predetermined value Vmin, the processing proceeds to Step ST20, the output of the power storage system 1B is stopped, and electric power is supplied to the load 2 from the system 3.

Figure 20:
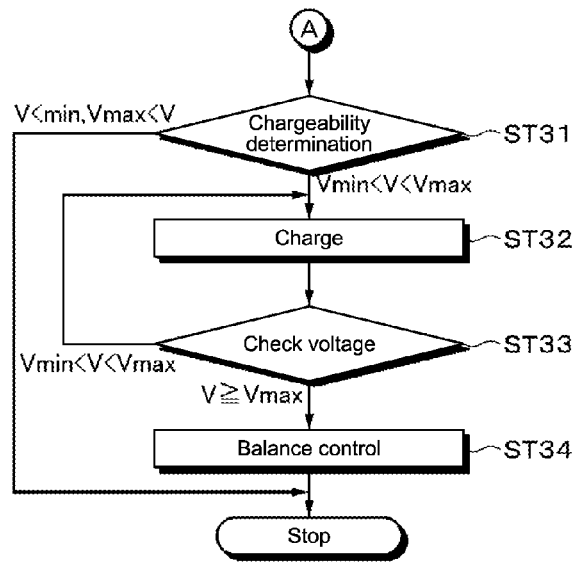
FIG. 20 is a flowchart for describing a flow of processing in charge processing in the second embodiment.

The charge processing (processing referred to as "A" in FIG. 19) will be described with reference to a flowchart of FIG. 20. First, in Step ST31, chargeability is determined. That is, whether or not the voltage V of each power storage module MOD is within the predetermined range (Vmin<V<Vmax) is determined. If the voltage V of each power storage module MOD is not within the predetermined range, if, for example, a certain power storage module MOD is excessively discharged (excessively charged), the processing is terminated and charging is not performed. If the voltage V of each power storage module MOD is within the predetermined range, the processing proceeds to Step ST32 and, for example, charging is performed with electric power supplied from the system 3. Then, the processing proceeds to Step ST33.

In Step ST33, the voltage V of each power storage module MOD is checked and any voltage V is within the predetermined range (Vmin<V<Vmax), the processing returns to Step ST31 and charging is continued. If maximum voltage of the voltage V has reached Vmax, the processing proceeds to Step ST34 and the balance control is performed. The balance control has been described in detail in the first embodiment, and hence a duplicated description will be omitted. After the balance control is performed, the processing is terminated.

Figure 21:
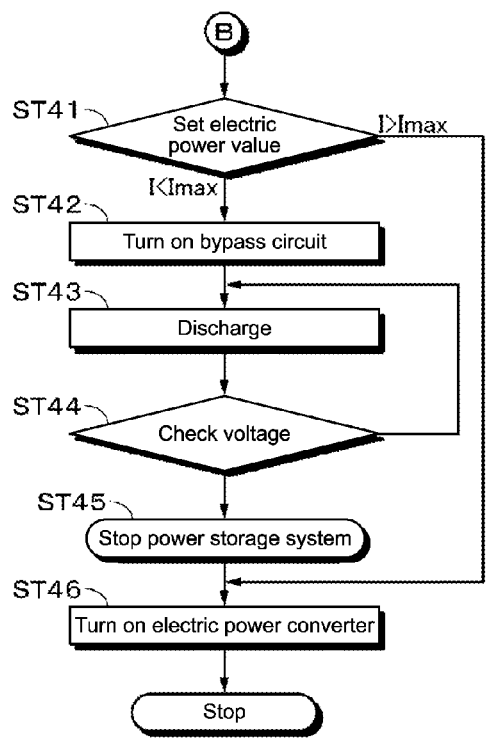
FIG. 21 is a flowchart for describing a flow of processing performed in the case where an abnormality has occurred in a predetermined string in the second embodiment.

The processing in the case where an abnormality has occurred in a certain string STR (processing referred to as "B" in FIG. 19) will be described with reference to a flowchart of FIG. 21. First, in Step ST41, processing of setting the discharge current of the power storage modules MOD in the normal strings STR and setting an electric power value such that electric power similar to that of the usual case can be supplied to the load 2 is performed. Here, if abnormalities have occurred in a plurality of strings STR and a newly set discharge current I exceeds an upper limit value Imax, the processing proceeds to Step ST46. In Step ST46, the output from the power storage system 1B is stopped, the AC/DC converter 4 is turned on, and electric power is supplied to the load 2 from the system 3. If the newly set discharge current I does not exceed the upper limit value Imax, the processing proceeds to Step ST42.

In Steps ST42 and 43, the string STR in which the abnormality has occurred is separated and discharged by turning on/off a predetermined switch of the bypass circuit 60. Then, the processing proceeds to Step ST44.

In Step ST44, the voltage of the power storage module MOD is periodically checked. Here, if the voltage of the power storage module MOD drops below a set value, for example, the processing proceeds to Step ST45 and the output from the power storage system 1B is stopped. Then, the processing proceeds to Step ST46, the AC/DC converter 4 is turned on, and electric power is supplied to the load 2 from the system 3.

Figure 22:
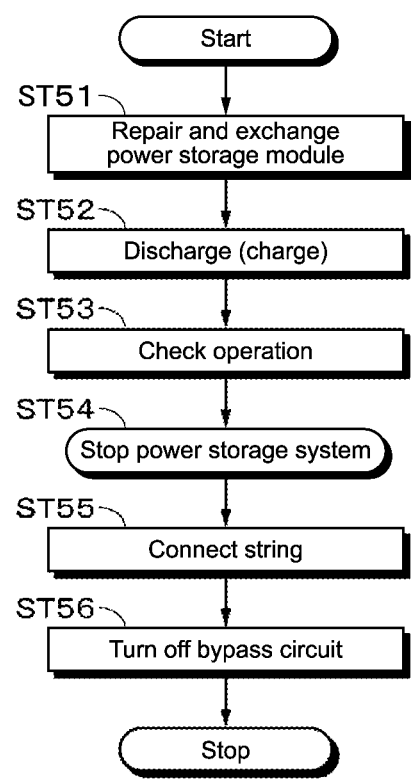
FIG. 22 is a flowchart for describing a flow of processing of a restoration operation of the string in the second embodiment.

A restoration operation of the string STR will be described with reference to a flowchart of FIG. 22. In Step ST51, after some or all of the power storage modules MOD of the strings STR in which abnormalities have occurred are repaired or exchanged, discharging, charging, and the like are experimentally performed in Steps ST52 and 53 and operations of the exchanged strings STR are checked.

If it is confirmed that the strings STR normally operate, the processing proceeds to Step ST54 and the power storage system 1B is stopped. At this time, if the load 2 requires electric power, the electric power is supplied from the system 3. Then, the processing proceeds to Step ST55 and the exchanged strings STR and other strings STR are connected. Note that, at this time, the balance control may be performed between the exchanged strings STR and the other strings STR. Then, the processing proceeds to Step ST56.

In Step ST56, a predetermined switch of the bypass circuit 60 is turned on/off, the strings STR after exchange are connected to the power storage system 1B, and electric power including the output from the strings STR after exchange is supplied to the load 2. Then, the processing is terminated.

In accordance with the above-mentioned second embodiment, even if an abnormality has occurred in a certain string, it becomes possible to supply electric power to the load by the use of other strings without stopping the power storage system. Further, by increasing the discharge current of the power storage module in the string, it becomes possible to maintain stable electric power supply to the load.

3. Application Examples (Power Storage System in House as Application Example)

Figure 23:
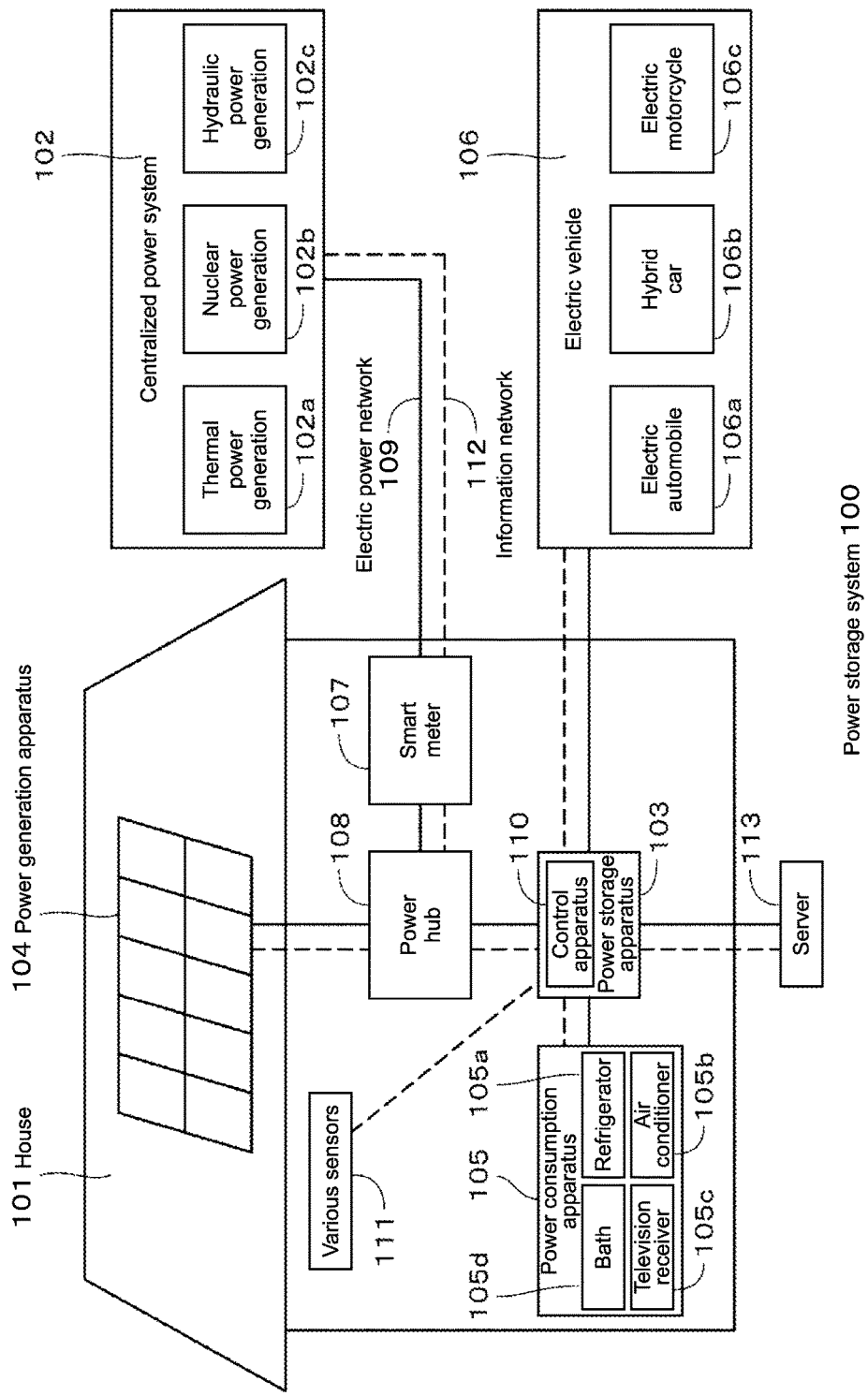
FIG. 23 is a diagram describing a power storage system for a house.

An example in which the present technology is applied to a power storage system for a house will be described with reference to FIG. 23. For example, in a power storage system 100 for a house 101, electric power is supplied from a centralized power system 102 such as a thermal power generation 102a, a nuclear power generation 102b, and a hydraulic power generation 102c to a power storage apparatus 103 via an electric power network 109, an information network 112, a smart meter 107, a power hub 108, and the like. In addition, electric power is supplied from an independent power source such as a domestic power generation apparatus 104 to the power storage apparatus 103. The electric power supplied to the power storage apparatus 103 is stored. The power storage apparatus 103 is used to supply electric power to be used in the house 101. It is not limited to the house 101, and a similar power storage system can be used for a building.

In the house 101, a power generation apparatus 104, a power consumption apparatus 105, the power storage apparatus 103, a control apparatus 110 that controls each apparatus, the smart meter 107, and sensors 111 that acquire various types of information are provided. The respective apparatuses are connected to one another via the electric power network 109 and the information network 112. As the power generation apparatus 104, a solar battery, a fuel battery, and the like are used. The generated electric power is supplied to the power consumption apparatus 105 and/or the power storage apparatus 103. The power consumption apparatus 105 includes, for example, a refrigerator 105a, an air conditioner 105b, a television receiver 105c, and a bath 105d. Further, the power consumption apparatus 105 includes an electric vehicle 106. The electric vehicle 106 is an electric automobile 106a, a hybrid car 106b, or an electric motorcycle 106c.

The above-mentioned power storage system of the present technology is applied to the power storage apparatus 103. The power storage apparatus 103 is constituted of a secondary battery or a capacitor. For example, it is constituted of a lithium ion secondary battery. The lithium ion secondary battery may be a stationary battery or may be one used in the electric vehicle 106. The smart meter 107 has a function of monitoring the amount of use of commercial electric power and transmitting the measured amount of use to an electric power company. The power supply of the electric power network 109 may be any one of direct-current power supply, alternating-current power supply, and non-contact power supply or combination thereof.

Examples of the various sensors 111 include a motion sensor, an illuminance sensor, an object detection sensor, a power consumption sensor, a vibration sensor, a contact sensor, a temperature sensor, and an infrared sensor. The information acquired by the various sensors 111 is transmitted to the control apparatus 110. On the basis of the information from the sensors 111, a weather state, a person state, and the like are grasped, and it is possible to minimize the energy consumption by automatically controlling the power consumption apparatus 105. Further, the control apparatus 110 is capable of transmitting information on the house 101 to the external electric power company and the like via the Internet.

The power hub 108 executes processing such as branching of a power line and direct current/alternating current conversion. Examples of the communication system of the information network 112 connected to the control apparatus 110 include a method of using a communication interface such as a UART (Universal Asynchronous Receiver-Transceiver: transmission/reception circuit for asynchronous serial communication) and a method of using a sensor network that conforms to wireless communication standards such as Bluetooth (registered trademark), ZigBee (registered trademark), and Wi-Fi. The Bluetooth (registered trademark) system is applied to multimedia communication and one-to-many connection communication can be performed. ZigBee (registered trademark) uses the physical layer of IEEE (Institute of Electrical and Electronics Engineers) 802.15.4. The IEEE802.15.4 is a name of a short-range wireless network standard called PAN (Personal Area Network) or W (Wireless) PAN.

The control apparatus 110 is connected to an external server 113. This server 113 may be managed by any one of the house 101, the electric power company, and a service provider. Information transmitted/received to/from the server 113 is, for example, power consumption information, life pattern information, electric power charge, weather information, disaster information, or information on power transaction. Such information may be transmitted/received to/from the domestic power consumption apparatus (e.g., television receiver). However, it may be transmitted/received to/from an apparatus (e.g., mobile phone) outside the house. Such information may be displayed on an apparatus having a display function such as a television receiver, a mobile phone, and a PDA (Personal Digital Assistants).

The control apparatus 110 that controls the respective blocks includes a CPU (Central Processing Unit), a RAM (Random Access Memory), a ROM (Read Only Memory), and the like and is stored in the power storage apparatus 103 in this example. The control apparatus 110 is connected to the power storage apparatus 103, the domestic power generation apparatus 104, the power consumption apparatus 105, the various sensors 111, and the server 113 via the information network 112. The control apparatus 110 has a function of adjusting the amount of use of commercial electric power and the amount of power generation, for example. Note that the control apparatus 110 may additionally have a function of performing power transaction in a power market, for example.

As described above, electric power generated not only by the centralized power system 102 such as the thermal power generation 102a, the nuclear power generation 102b, and the hydraulic power generation 102c but also by the domestic power generation apparatus 104 (solar power generation, wind power generation) can be stored in the power storage apparatus 103. Therefore, even when the amount of electric power generated by the domestic power generation apparatus 104 fluctuates, it is possible to perform control, e.g., keep the amount of electric power transmitted to the outside constant or discharge only a necessary amount of electric power. For example, a possible method is to store electric power obtained by solar power generation in the power storage apparatus 103 and store cheaper midnight electric power in the power storage apparatus 103 at night and use the electric power stored in the power storage apparatus 103 by discharging it in the daytime when electricity is more expensive.

Note that, although the example in which the control apparatus 110 is housed in the power storage apparatus 103 has been described in this example, the control apparatus 110 may be housed in the smart meter 107 or may be independently configured. Further, the power storage system 100 may be used for a plurality of houses in an apartment building or for a plurality of detached houses.

(Power Storage System in Vehicle as Application Example)

Figure 24:
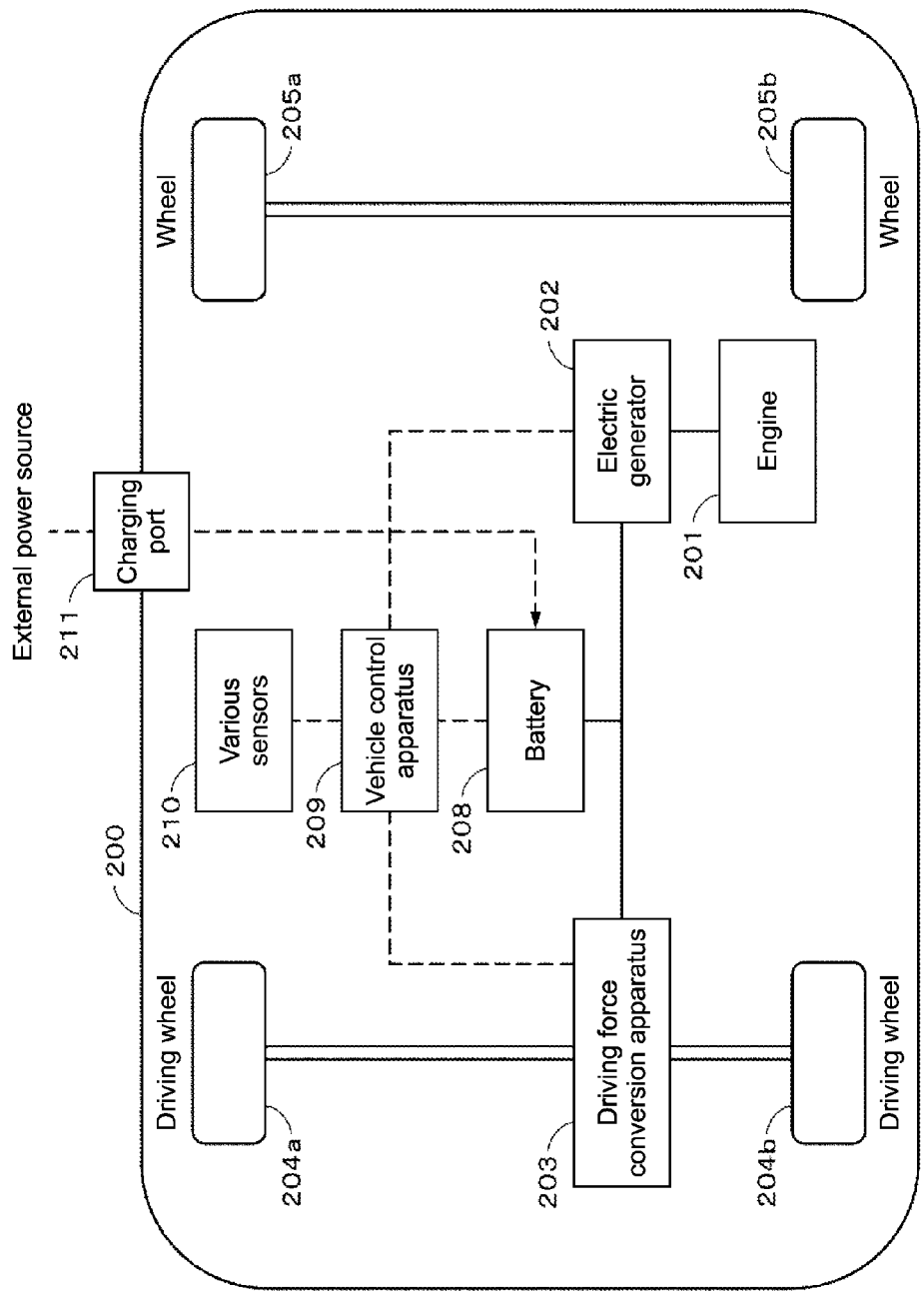
FIG. 24 is a diagram describing an example configuration of a hybird vehicle.

An example in which the present technology is applied to a power storage system for a vehicle will be described with reference to FIG. 24. FIG. 24 schematically shows an example of the configuration of a hybrid vehicle that employs a series hybrid system to which the present technology is applied. A vehicle of the series hybrid system runs with an electric power/driving force conversion apparatus by using electric power generated in an electric generator driven by an engine or electric power temporarily stored in a battery.

This hybrid vehicle 200 includes an engine 201, an electric generator 202, an electric power/driving force conversion apparatus 203, a driving wheel 204a, a driving wheel 204b, a wheel 205a, a wheel 205b, a battery 208, a vehicle control apparatus 209, various sensors 210, and a charging port 211. The above-mentioned power storage system of the present technology is applied to the battery 208.

The hybrid vehicle 200 runs by using the electric power/driving force conversion apparatus 203 as a power source. An example of the electric power/driving force conversion apparatus 203 is a motor. The electric power/driving force conversion apparatus 203 is actuated due to electric power of the battery 208 and torque of the electric power/driving force conversion apparatus 203 is transmitted to the driving wheels 204a and 204b. Note that the electric power/driving force conversion apparatus 203 can be applied as both of an alternating-current motor and a direct-current motor by using direct current-alternating current (DC-AC) or reverse conversion (AC-DC conversion) at a necessary portion. The various sensors 210 controls r.p.m. of the engine via the vehicle control apparatus 209, opening (throttle opening) of a throttle valve (not shown), and the like. The various sensors 210 include a velocity sensor, an acceleration sensor, an engine r.p.m. sensor, and the like.

The torque of the engine 201 is transmitted to the electric generator 202 and electric power generated with the torque by the electric generator 202 can be stored in the battery 208.

When the hybrid vehicle is decelerated by a braking mechanism (not shown), resistance force at the time of the deceleration is added to the electric power/driving force conversion apparatus 203 as torque, and regenerative electric power generated with this torque by the electric power/driving force conversion apparatus 203 is stored in the battery 208.

By being connected to a power source outside the hybrid vehicle, the battery 208 is also capable of receiving electric power supply from the external power source by using the charging port 211 as an input port, and storing the received electric power.

Although not shown in the figure, an information processing apparatus that executes information processing relating to vehicle control on the basis of information on a secondary battery may be provided. Examples of such an information processing apparatus include an information processing apparatus that displays the remaining capacity of the battery on the basis of information on the remaining capacity of the battery.

Note that the series hybrid vehicle that runs with the motor by using electric power generated by the electric generator driven by the engine or electric power temporarily stored in the battery has been described above as an example. However, the present technology can be effectively applied also to a parallel hybrid vehicle that uses output of an engine and output of a motor as driving sources and appropriately switches three systems of running with only the engine, running with only the motor, and running with the engine and the motor for the use. Further, the present technology can be effectively applied also to a so-called electric vehicle, which does not use an engine and runs by driving of only a driving motor.

4. Modified Examples

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It should be noted that the present technology can also take the following configurations.

(1)

A power storage module, including:
a battery section;
a controller;
a communication unit;
a first insulator that insulates the controller from the communication unit; and
a second insulator having a withstand voltage higher than a withstand voltage of the first insulator.

(2)

A power storage apparatus, including:
a plurality of power storage modules connected in series; and
a control apparatus that controls each power storage module, the power storage module including
a controller,
a communication unit,
a first insulator that insulates the controller from the communication unit, and
a second insulator having a withstand voltage higher than a withstand voltage of the first insulator, the second insulator being provided between the communication unit of each power storage module and the control apparatus.

(3)

The power storage apparatus according to (2), including a balance circuit that controls voltage of battery sections of the respective power storage modules to be equal and includes a power storage element.

(4)

The power storage apparatus according to (3), in which the control apparatus and the power storage element are connected to each other via a common power source line different from a power line to which the battery section is connected, and the control apparatus is configured to generate power source voltage of the controller on the basis of voltage supplied from the power storage element such that the power source voltage is supplied to the communication unit via the second insulator.

(5)

The power storage apparatus according to (3) or (4), in which a third insulator is provided between the power storage element and the control apparatus.

(6)

A power storage system, including:

a plurality of power storage apparatuses each being the power storage apparatus according to (2), the plurality of power storage apparatuses being connected in series; and an integrated control apparatus that communicates with each control apparatus.

(7)

The power storage system according to (6), in which the integrated control apparatus includes a fourth insulator.

(8)

The power storage system according to (6) or (7), including a bypass circuit that selectively supplies output of a predetermined power storage apparatus of the plurality of power storage apparatuses to a load.

(9)

The power storage system according to (8), in which the integrated control apparatus is configured to perform control to increase, when the output of the predetermined power storage apparatus is selectively supplied to the load, discharge current of the predetermined power storage apparatus while keeping the discharge current below an upper limit value.

(10)

A control method in the power storage system according to (6), including: by the integrated control apparatus, performing control to selectively supply output of a predetermined power storage apparatus of the plurality of power storage apparatuses to a load; and performing control to increase, when the output of the predetermined power storage apparatus is selectively supplied to the load, discharge current of the predetermined power storage apparatus while keeping the discharge current below an upper limit value.

(11)

An electronic apparatus that receives supply of electric power from the power storage system according to (6).

(12)

An electric vehicle, including:

a conversion apparatus that receives supply of electric power from the power storage system according to (6) and converts the electric power into driving force of a vehicle; and a control apparatus that performs information processing relating to vehicle control on the basis of information on the power storage apparatus.

(13)

An electric power system including an electric power information transmitter/receiver that transmits/receives a signal to/from another apparatus via a network, the electric power system performing charge/discharge control of the power storage system according to (6) on the basis of information received by the transmitter/receiver.

(14)

An electric power system that receives supply of electric power from the power storage system according to (6) or supplies electric power to the power storage system from a power generation apparatus or an electric power network.

Although embodiments of the present technology have been specifically described, the embodiments of the present technology are not limited to the above-mentioned embodiments and various modifications can be made without departing from the technical idea of the present technology. For example, the configurations, the methods, the processes, the shapes, the materials, and the numerical values cited in the above-mentioned embodiments are only illustrative, and different configurations, methods, processes, shapes, materials, and numerical values may be used as necessary.

Also, the configurations, the methods, the processes, the shapes, the materials, and the numerical values in the above-mentioned embodiments can be combined without departing from the essence of the present technology. Further, the present technology is not limited to the apparatus or system and can be realized as a method or the like.

REFERENCE SIGNS LIST

MOD . . . power storage module
CNT . . . module controller
ICNT . . . control box
INC . . . integrated controller
BB . . . battery block group
ISA . . . first insulator
ISB . . . second insulator
ISC, ISD . . . insulator
COM . . . communication unit
CL+, CL− . . . common power source line
50 . . . balance circuit
51 . . . power storage element
60 . . . bypass circuit

The invention claimed is:

1. A power storage system, comprising a plurality of power storage apparatuses connected in series,
    wherein the power storage apparatuses including:
    a plurality of power storage modules connected in series; and
    a control apparatus that controls each power storage module, the power storage module including
    a controller,
        a communication unit,
        a first insulator that insulates the controller from the communication unit, and
        a second insulator having a withstand voltage higher than a withstand voltage of the first insulator and higher than an output of the power storage system, the second insulator being provided between the communication unit of each power storage module and the control apparatus.

2. The power storage system according to claim 1, wherein the power storage apparatuses include a balance circuit that controls voltage of battery sections of the respective power storage modules to be equal and includes a power storage element.

3. The power storage system according to claim 2, wherein
the control apparatus and the power storage element are connected to each other via a common power source line different from a power line to which the battery section is connected, and
the control apparatus is configured to generate power source voltage of the controller on the basis of voltage supplied from the power storage element such that the power source voltage is supplied to the communication unit via the second insulator.

4. The power storage system according to claim 2, wherein the power storage apparatuses include a third insulator i-s-provided between the power storage element and the control apparatus.

5. The power storage system according to claim 1, comprising an integrated control apparatus that communicates with each control apparatus.

6. The power storage system according to claim 5, wherein
the integrated control apparatus includes a fourth insulator.

7. The power storage system according to claim 5, comprising
a bypass circuit that selectively supplies output of a predetermined power storage apparatus of the plurality of power storage apparatuses to a load.

8. The power storage system according to claim 7, wherein
the integrated control apparatus is configured to perform control to increase, when the output of the predetermined power storage apparatus is selectively supplied to the load, discharge current of the predetermined power storage apparatus while keeping the discharge current below an upper limit value.

9. The power storage system according to claim 5, wherein the integrated control apparatus is configured to:
performing control to selectively supply output of a predetermined power storage apparatus of the plurality of power storage apparatuses to a load; and
performing control to increase, when the output of the predetermined power storage apparatus is selectively supplied to the load, discharge current of the predetermined power storage apparatus while keeping the discharge current below an upper limit value.

10. An electronic apparatus that receives supply of electric power from the power storage system according to claim 5.

11. An electric vehicle, comprising:
a conversion apparatus that receives supply of electric power from the power storage system according to claim 5 and converts the electric power into driving force of a vehicle; and
a control apparatus that performs information processing relating to vehicle control on the basis of information on the power storage apparatus.

12. An electric power system, comprising
an electric power information transmitter/receiver that transmits/receives a signal to/from another apparatus via a network, the electric power system performing charge/discharge control of the power storage system according to claim 5 on the basis of information received by the transmitter/receiver.

13. An electric power system that receives supply of electric power from the power storage system according to claim 5 or supplies electric power to the power storage system from a power generation apparatus or an electric power network.

* * * * *